(12) United States Patent
Sasaki et al.

(10) Patent No.: US 11,188,186 B2
(45) Date of Patent: Nov. 30, 2021

(54) PART DISPLAY APPARATUS, ELECTRONIC MUSIC APPARATUS, AND PART DISPLAY METHOD

(71) Applicant: YAMAHA CORPORATION, Hamamatsu (JP)

(72) Inventors: Naoya Sasaki, Hamamatsu (JP); Taku Ohno, Hamamatsu (JP); Akiko Nishimura, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 193 days.

(21) Appl. No.: 16/507,172

(22) Filed: Jul. 10, 2019

(65) Prior Publication Data

US 2019/0332209 A1 Oct. 31, 2019

Related U.S. Application Data

(63) Continuation of application No. PCT/JP2018/001372, filed on Jan. 18, 2018.

(30) Foreign Application Priority Data

Jan. 18, 2017 (JP) .............................. JP2017-006949

(51) Int. Cl.
*G06F 3/048* (2013.01)
*G06F 3/02* (2006.01)
*G06F 3/14* (2006.01)

(52) U.S. Cl.
CPC ............ *G06F 3/048* (2013.01); *G06F 3/0219* (2013.01); *G06F 3/1446* (2013.01)

(58) Field of Classification Search
None
See application file for complete search history.

(56) References Cited

U.S. PATENT DOCUMENTS

2009/0067641 A1* 3/2009 Lengeling ............. G06F 3/0487
381/80
2013/0266155 A1 10/2013 Mashita et al.

FOREIGN PATENT DOCUMENTS

JP 2008158435 A 7/2008
JP 2009180757 A 8/2009
(Continued)

OTHER PUBLICATIONS

International Search Report issued in Intl. Appln. No. PCT/JP2018/001372 dated Mar. 27, 2018. English translation provided.
(Continued)

*Primary Examiner* — Amare Mengistu
*Assistant Examiner* — Sarvesh J Nadkarni
(74) *Attorney, Agent, or Firm* — Rossi, Kimms & McDowell LLP

(57) ABSTRACT

Provided is a part display apparatus. The part display apparatus includes: a tab display unit configured to display a plurality of tabs respectively corresponding to a plurality of part groups; a digest information display unit configured to display, in each tab of the plurality of tabs, digest information of each part of the part group corresponding to that tab; a tab selection reception unit configured to receive selection of any one of the plurality of tabs; and a detailed information display unit configured to display a part detail screen including detailed information of the part group corresponding to the selected tab.

17 Claims, 20 Drawing Sheets

(56) References Cited

FOREIGN PATENT DOCUMENTS

| JP | 2010164628 A | 7/2010 |
|----|--------------|--------|
| JP | 4781491 B1 | 9/2011 |

OTHER PUBLICATIONS

Written Opinion issued in Intl. Appln. No. PCT/JP2018/001372 dated Mar. 27, 2018.

* cited by examiner

PART DISPLAY APPARATUS, ELECTRONIC MUSIC APPARATUS, AND PART DISPLAY METHOD

CROSS REFERENCE TO RELATED APPLICATIONS

The present application is a continuation application of International Application No. PCT/JP2018/1372, filed Jan. 18, 2018, which claims a priority to Japanese Patent Application No. 2017-6949, filed Jan. 18, 2017. The contents of these applications are incorporated herein by reference in their entirety.

FIELD OF INVENTION

The present invention relates to a part display apparatus, an electronic music apparatus, and a part display method.

BACKGROUND

In an electronic musical apparatus such as an electronic musical instrument and a mixer, information related to multiple parts is displayed on a display. A DJ (disc jockey) system described in JP 478149B (hereinafter referred to as "Patent Literature 1") includes a DJ controller and a personal computer. The DJ controller includes the function of a mixer and can perform operation on audio signals assigned to four channels (parts). A DJ application is installed in a personal computer. The display screen of the DJ application includes four channel display regions corresponding to the four channels. A channel name, various types of setting information, and the like are displayed in each channel display region.

SUMMARY of INVENTION

In the DJ system disclosed in Patent Literature 1 above, display regions corresponding to all parts are ensured on the display screen. However, if the number of parts increases, it is difficult to ensure display regions corresponding to all parts on the display screen. In view of this, it is conceivable to selectively provide only display regions corresponding to some parts. However, in this case, it is necessary to switch the display in order to check the information on a part that has not been selected, which lacks convenience.

An object of one embodiment of the present invention is to provide a part display apparatus by which it is possible to easily check respective information on parts without sacrificing the convenience, even if there is a large number of parts, and an electronic music apparatus including the part display apparatus.

A part display apparatus according to an aspect of the present invention includes: a tab display means for displaying a plurality of tabs respectively corresponding to a plurality of part groups; a digest information display means for displaying, in each tab of the plurality of tabs, digest information of each part of the part group corresponding to that tab; a tab selection reception means for receiving selection of any one of the plurality of tabs; and a detailed information display means for displaying a part detail screen including detailed information of the part group corresponding to the selected tab.

In this part display apparatus, when any one of multiple displayed tabs is selected, a part detail screen that includes detailed information of the part group corresponding to the selected tab is displayed. Accordingly, detailed information of a desired part group can be displayed in a limited space. Also, on each tab, the digest information of the parts in the corresponding part group is displayed. Accordingly, by viewing an unselected tab, the user can check the digest information of the parts corresponding to the tab. Accordingly, even if there is a large number of parts, the information on the parts can be easily checked without sacrificing the convenience.

The digest information may also indicate whether or not each part of the part group corresponding to that digest information is in use. In this case, the user can easily check whether the part corresponding to the unselected tab is in use or not in use.

The part display apparatus may also further include a usage-state setting means for setting each part of the plurality of part groups to be in use or not in use.

The part detail screen may also include a plurality of part display regions respectively corresponding to the plurality of parts of the part group corresponding to the selected tab, and in each part display region, first information relating to the part corresponding to that part display region may also be displayed as the detailed information. In this case, the user can easily check the first information of the parts corresponding to the selected tab.

The part detail screen may also further include an additional display region, and second information relating to at least one part in the plurality of part groups may also be displayed in the additional display region. In this case, the user can check the first information of the parts corresponding to the selected tab and the second information relating to at least one part on a common part detail screen.

The part display apparatus may also further include a part designation reception means for receiving designation of any one part in the plurality of part groups, and information relating to the designated part may also be displayed as the second information in the additional display region. In this case, the user can easily check the second information of a desired part in an additional display region.

The first information may also include a plurality of pieces of setting information set for a corresponding part, the part display apparatus may also further include an information designation reception means for receiving designation of any one of the plurality of pieces of setting information in the part display region corresponding to the designated part, and information corresponding to the designated setting information may also be displayed as the second information in the additional display region. In this case, the user can display the second information corresponding to the desired setting information in an additional display region using a simple operation.

At least one of the plurality of pieces of setting information may also be parameter information indicating a parameter, if the parameter information has been designated among the plurality of pieces of setting information, a parameter adjuster for adjusting the parameter indicated by the designated parameter information may also be displayed as the second information in the additional display region, the part display apparatus may also further include an operation reception means for receiving an operation of the parameter adjuster in the additional display region, and display of the designated parameter information may also change in the part display region so as to comply with the operation of the parameter adjuster in the additional display region.

In this case, the user can easily adjust the parameter of the designated part by operating the parameter adjuster displayed in the additional display region. Also, since the change to the parameter resulting from the operation of the parameter adjuster is reflected also in the display of the part display region, the user can check the adjusted parameter in both the part display region and the additional display region.

One or more timbres may also be allocated to the part, and an acoustic device may also be allocated to the part.

An electronic music apparatus according to an aspect of the present invention may also include the above-described part display apparatus.

The electronic music apparatus according to an aspect of the present invention may also further include: a part display apparatus capable of displaying the above-described additional display region; a plurality of pitch designators; a pitch range setting means for setting a pitch range for each part; and a correspondence relationship setting means for setting a correspondence relationship between the set pitch range and the plurality of pitch designators, and the set correspondence relationship may also be displayed in the additional display region. In this case, the user can easily check the correspondence relationship between the pitch range and the multiple pitch operators of the parts.

A control terminal apparatus according to an aspect of the present invention may also include the above-described part display apparatus.

A part display method according to an aspect of the present invention includes: a step of displaying a plurality of tabs respectively corresponding to a plurality of part groups; a step of displaying, in each tab of the plurality of tabs, digest information of each part of the part group corresponding to that tab, superimposed on that tab; a step of receiving selection of any one of the plurality of tabs; and a step of displaying a part detail screen including detailed information of the part group corresponding to the selected tab.

A part display program according to an aspect of the present invention includes: a step of displaying a plurality of tabs respectively corresponding to a plurality of part groups; a step of displaying, in each tab of the plurality of tabs, digest information of each part of the part group corresponding to that tab, superimposed on that tab; a step of receiving selection of any one of the plurality of tabs; and a step of displaying a part detail screen including detailed information of the part group corresponding to the selected tab.

According to the method and the program, even if there is a large number of parts, the information of the parts can easily be checked without sacrificing the convenience.

According to the present invention, even if there is a large number of parts, the information of the parts can easily be checked without sacrificing the convenience.

DETAILED DESCRIPTION OF THE PREFERRED EMBODIMENTS

Hereinafter, a part display apparatus and a part display method according to several embodiments of the present invention will be described in detail with reference to the drawings.

(1) First Embodiment (1-1) Configuration of Electronic Music Apparatus

Figure 1:
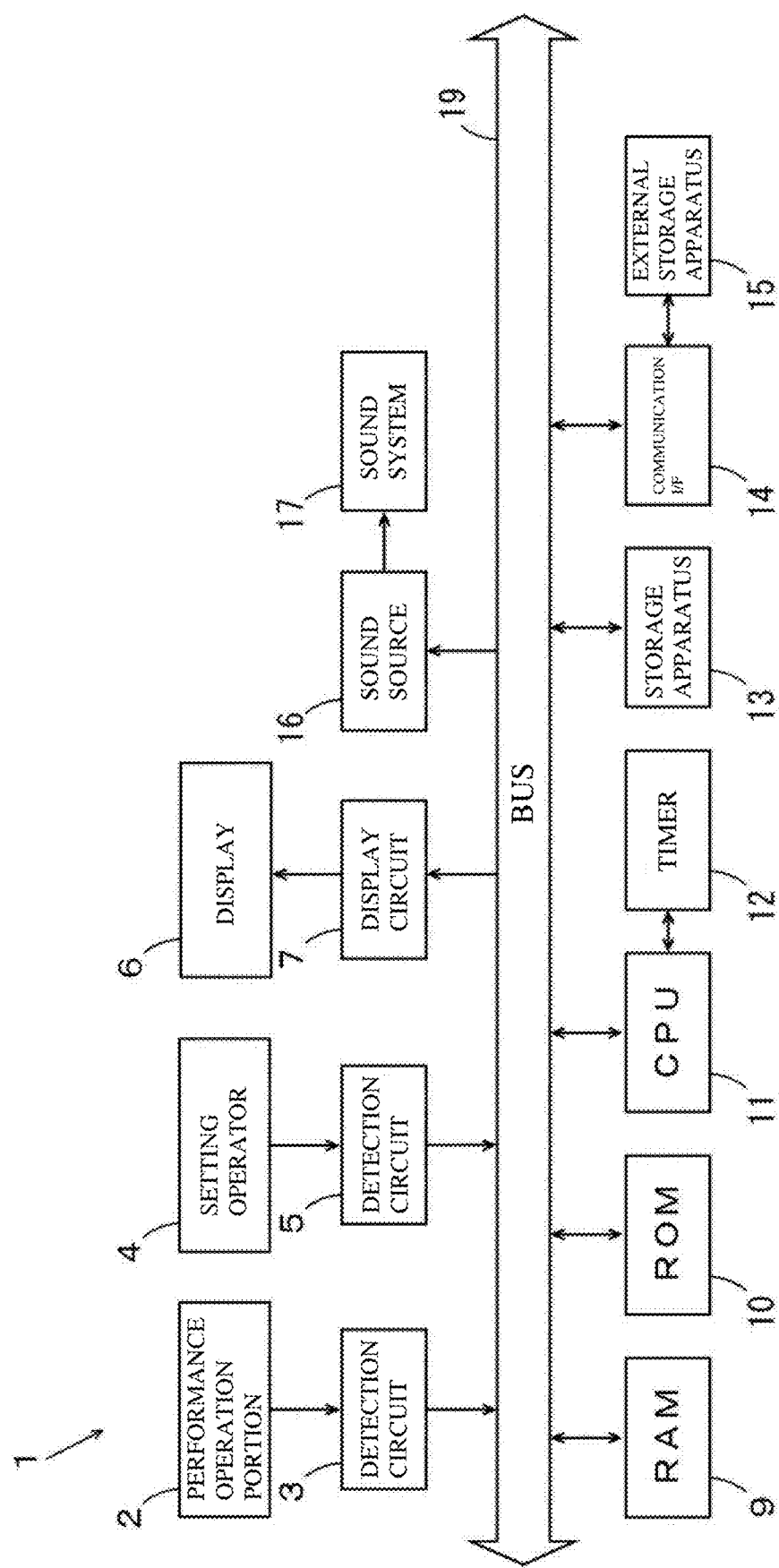
FIG. 1 is a block diagram showing a configuration of an electronic musical instrument according to a first embodiment.

FIG. 1 is a block diagram showing a configuration of an electronic music apparatus including a part display apparatus according to the present embodiment. The electronic music apparatus 1 of FIG. 1 is an electronic keyboard instrument that can be used to perform and create a musical piece. The electronic music apparatus 1 includes a performance operation portion 2, a detection circuit 3, a setting operator 4, a detection circuit 5, a display 6, and a display circuit 7.

In the present example, the performance operation portion 2 is a keyboard including multiple keys. The keys are examples of pitch designators. The performance operation portion 2 is connected to a bus 19 via the detection circuit 3, and performance data obtained based on a performance operation of a user is input using the performance operation portion 2. The performance data includes pitch information and velocity information. The setting operator 4 includes a switch that is switched on and off, a variable resistor (volume) that is rotated or slid, and the like, and is connected to the bus 19 via the detection circuit 5. The setting operator 4 is used to switch timbres, adjust the volume, switch the power on and off, and perform various settings.

The display 6 is connected to the bus 19 via the display circuit 7. Various types of information relating to the performance, settings, or the like are displayed on the display 6. At least part of the display 6 and the setting operator 4 may be constituted by a touch panel display.

The electronic music apparatus 1 further includes a RAM (random access memory) 9, a ROM (read-only memory) 10, a CPU (central processing unit) 11, a timer 12, a storage apparatus 13, and a communication I/F (interface) 14. The RAM 9, the ROM 10, the CPU 11, the storage apparatus 13, and the communication I/F 14 are connected to the bus 19, and the timer 12 is connected to the CPU 11. An external device such as an external storage apparatus 15 may also be connected to the bus 19 via the communication I/F 14. The RAM 9, the ROM 10, and the CPU 11 constitute a computer.

The RAM 9 is composed of a volatile memory, for example, is used as a work area of the CPU 11, and temporarily stores various types of data. The ROM 10 is composed of a non-volatile memory, for example, and stores computer programs such as a system program and a part display program. The CPU 11 operates as a part display apparatus by executing a part display program stored in the ROM 10 on the RAM 9, and performs later-described part display processing. The timer 12 provides the CPU 11 with time information such as the current time.

The storage apparatus 13 includes a storage medium such as a hard disk, an optical disk, a magnetic disk, or a memory card. The above-described part display program may also be stored in the storage apparatus 13. Similarly to the storage apparatus 13, the external storage apparatus 15 includes a storage medium such as a hard disk, an optical disk, a magnetic disk, or a memory card. The above-described part display program may also be stored in the external storage apparatus 15.

The part display program may be provided in a form of being stored in a computer-readable recording medium, and may be installed in the ROM 10 or the storage apparatus 13. Also, if the communication I/F 14 is connected to a communication network, a part display program distributed from a server connected to the communication network may also be installed in the ROM 10 or the storage apparatus 13.

The electronic music apparatus 1 further includes a sound source 16 and a sound system 17. The sound source 16 is connected to the bus 19, and the sound system 17 is connected to the sound source 16 and the bus 19. The sound source 16 generates an acoustic signal based on the performance data input from the performance operation portion 2, musical piece data provided from the storage apparatus 13, and the like, and adds an acoustic effect to the acoustic signal.

The sound system 17 includes: a digital-analog (D/A) conversion circuit, an amplifier, and a speaker. The sound system 17 produces a musical tone based on the acoustic signal provided from the sound source 16. An analog external speaker may also be connected to the electronic music apparatus 1. In this case, the acoustic signal generated by the sound source 16 is converted into an analog signal and the analog signal is output to the external speaker. Also, the acoustic signal generated by the sound source 16 may be output to an external apparatus via a USB (universal serial bus) cable or the like without being converted into an analog signal. In this case, the sound system 17 need not be provided.

(1-2) Configuration of Parts

The user can select the operation mode of the electronic music apparatus 1. In the present embodiment, a performance mode can be selected as the operation mode of the electronic music apparatus 1. In this case, one or more pieces of performance data are stored in the storage apparatus 13 of FIG. 1. The performance data is constituted by multiple parts, and indicates various parameters set for the multiple parts. One or more timbres can be allocated as parameters to each part. The timbres allocated to the parts may also be determined in advance, or may be set by the user. Note that the parts referred to in the present embodiment correspond to streams at a time when streams of the same or different timbres are overlaid in parallel in a time axis direction so as to form one piece of music. For example, when a stream for a musical instrument sound, such as a piano, guitar, or percussion instrument, which is accompaniment to vocals, is overlaid on a stream for vocals to form one piece of music, these streams correspond to parts. One part can be obtained by overlaying multiple streams of timbres, and for example, a stream obtained by overlaying a stream for piano and a stream for guitar can be one part referred to in the present embodiment.

Figure 2:
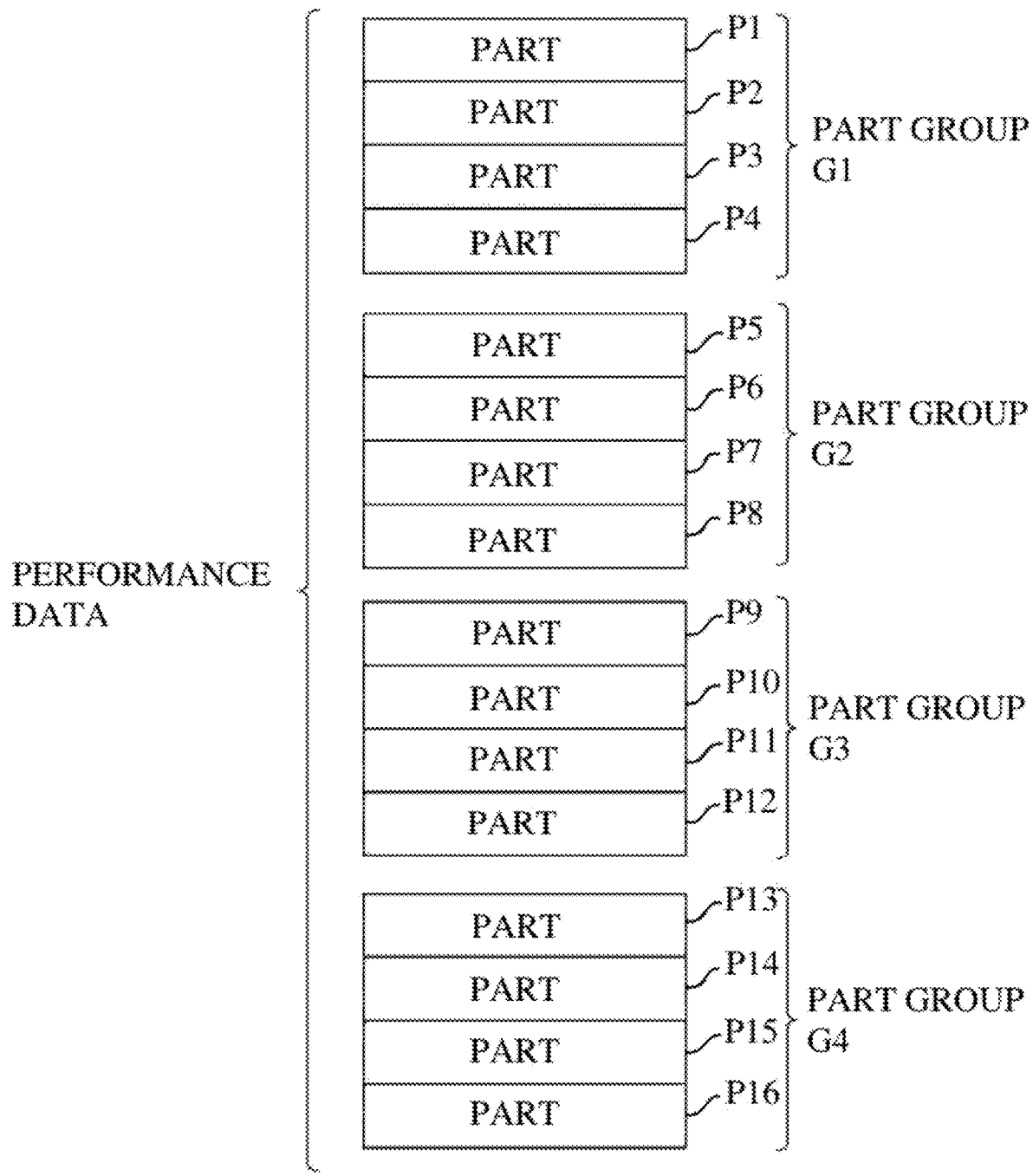
FIG. 2 is a diagram for illustrating an exemplary configuration of parts according to the first embodiment.

In the present embodiment, the multiple parts constituting one piece of performance data are divided into multiple part groups. FIG. 2 is a diagram for illustrating an exemplary configuration of parts. In the example shown in FIG. 2, one piece of performance data is constituted by 16 parts P1 to P16, and the parts P1 to P16 are divided into four part groups G1 to G4. The part group G1 includes the parts P1 to P4, the part group G2 includes the parts P5 to P8, the part group G3 includes the parts P9 to P12, and the part group G4 includes the parts P13 to P16.

In the performance mode, the user operates the setting operator 4 of FIG. 1, for example, to select one piece of performance data. When the user operates the performance operation portion 2, the acoustic signal including the multiple timbres is generated based on the selected performance data.

(1-3) Performance Screen

If the performance mode has been set as the operation mode, the performance screen is displayed on the display 6 of FIG. 1. The performance screen includes information on the parts of the performance data.

Figure 3:
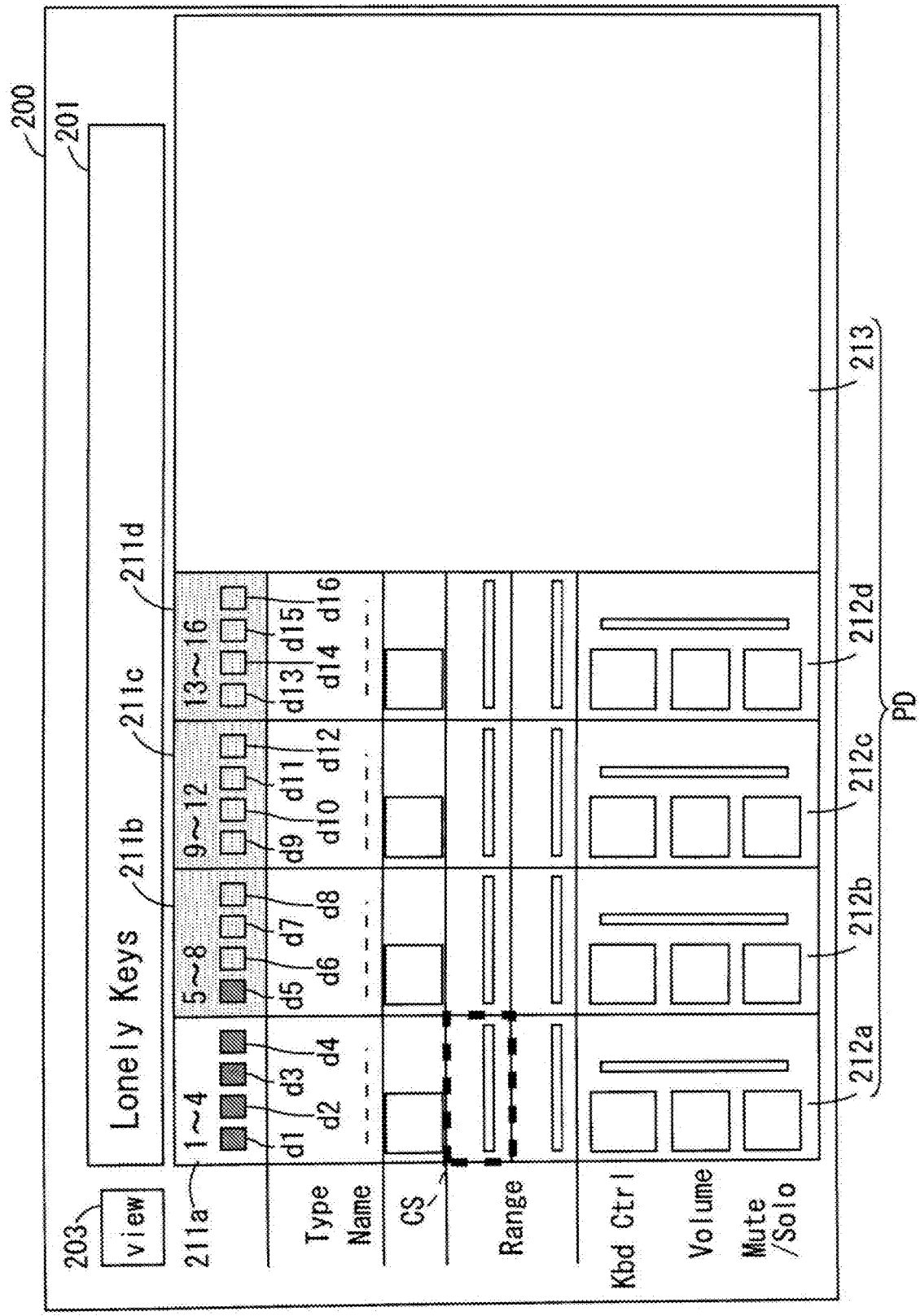
FIG. 3 is a diagram showing an example of a performance screen displayed on a display according to the first embodiment.

FIG. 3 is a diagram showing an example of a performance screen displayed on the display 6. The performance screen 200 of FIG. 3 includes: a name display region 201, a display switch button ("view" button) 203, tabs 211a to 211d, part display regions 212a to 212d, and an additional display region 213.

The name display region 201 is arranged in the upper portion of the performance screen 200. The name (performance name) of the selected performance data is displayed in the name display region 201. The user can switch the performance name displayed in the name display region 201 as needed. The display switch button 203 is arranged to the left of the name display region 201. The display switch button 203 is operated as follows in order to switch the performance screen 200.

The tabs 211a to 211d are arranged so as to be aligned below the name display region 201. The tabs 211a to 211d correspond to the part groups G1 to G4 of FIG. 2. Digest information relating to the parts in the corresponding part groups is displayed superimposed on the respective tabs 211a to 211d. In the present example, identification marks d1 to d16 respectively indicating whether parts are in use or not in use are displayed superimposed on the tabs 211a and 211d as the digest information. The identification marks d1 to d4 are displayed on the tab 211a, the identification marks d5 to d8 are displayed on the tab 211b, the identification marks d9 to d12 are displayed on the tab 211c, and the identification marks d13 to d16 are displayed on the tab 211d.

The identification marks d1 to d16 correspond to the parts P1 to P16 of FIG. 2. The identification marks d1 to d16 respectively indicate whether or not the corresponding parts are in use or not in use through a difference in color. For example, the identification marks d1 to d16 are respectively displayed with a relatively bright color if the corresponding parts are in use, and are displayed with a relatively dark color if the corresponding parts are not in use. More specifically, for example, each of the identification marks d1 to d16 may also be a display in which a green lamp is lit or extinguished. Normally, a timbre is allocated to a part that is in use, and a sound of the part that is in use is produced when the performance operation portion 2 of FIG. 1 is operated.

In FIG. 3, hatching is added to the identification marks corresponding to the parts that are in use. In the present example, hatching is added to the identification marks d1 to d5. Accordingly, the parts P1 to P5 are in use. On the other hand, the parts P6 to P16 are not in use.

The user can select one of the tabs 211a to 211d. The selected tab is displayed highlighted, for example, such that it can be easily visually checked. In the example of FIG. 3, the tab 211a has been selected.

The part display regions 212a to 212d are arranged below the tabs 211a to 211d. The additional display region 213 is arranged to the right of the tabs 211a to 211d and the part display regions 212a to 212d. The part detail screen PD is constituted by the part display regions 212a to 212d and the additional display region 213.

Note that the layout of the performance screen 200 is not limited to the example of FIG. 3. For example, the part display regions 212a to 212d may also be provided aligned vertically, or may be provided aligned vertically and laterally in a tiled form. Also, the positional relationship in the left-right direction of the part display regions 212a to 212d and the additional display region 213 may also be reversed.

(1-4) Example of Display in Part Display Region

The information of the parts of the part group corresponding to the selected tab is displayed in the part display regions 212a to 212d of FIG. 3. For example, if the tab 211a has been selected, the information of the part P1 is displayed in the part display region 212a, the information of the part P2 is displayed in the part display region 212b, the information of the part P3 is displayed in the part display region 212c, and the information of the part P4 is displayed in the part display region 212d. Similarly, if the tab 211b has been selected, the information of the parts P5 to P8 is displayed in the part display regions 212a to 212d, and if the tab 211c has been selected, the information of the parts P9 to P12 is displayed in the part display regions 212a to 212d. If the tab 211d has been selected, the information of the parts P13 to P16 is displayed in the part display regions 212a to 212d.

Figure 4:
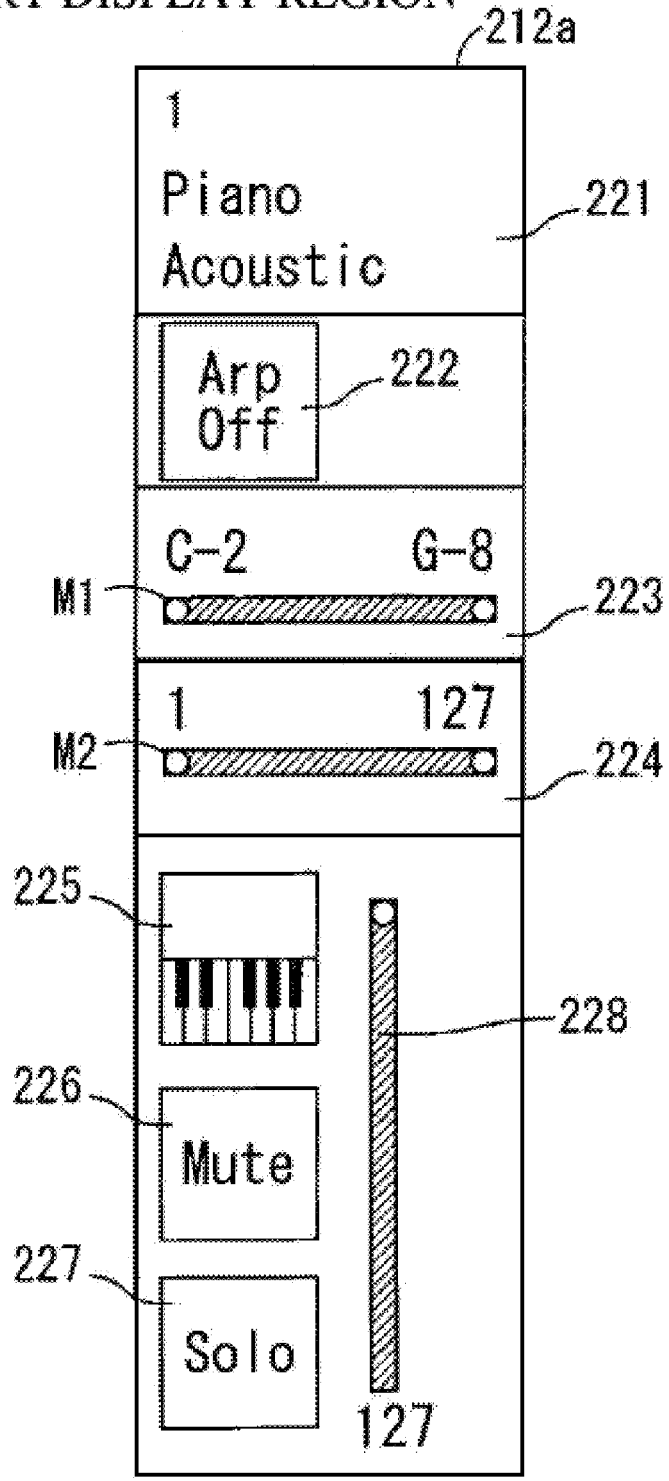
FIG. 4 is a diagram showing an example of display in a part display region according to the first embodiment.

Hereinafter, regarding display in the part display regions 212a to 212d, the display in the part display region 212a in the case where the tab 211a has been selected will be described as an example. FIG. 4 is a diagram showing an example of display in the part display region 212a. The part display region 212a includes a part name display portion 221, an arpeggio button 222, a note limit display portion 223, a velocity limit display portion 224, a keyboard control button 225, a mute button 226, a solo button 227, and a volume adjustment portion 228.

The type (part type) and name (part name) of the timbre allocated to part 1 are displayed in the part name display portion 221. In the example of FIG. 4, "Piano" is displayed as the part type, and "Acoustic" is displayed as the part name. The arpeggio button 222 is operated in order to switch the arpeggio function on and off. When the arpeggio function is switched on, the part P1 is subjected to sound production in accordance with a pre-set arpeggio pattern. The arpeggio button 222 displays the on/off state of the arpeggio function at the current time. The on/off state of the arpeggio function at the current time may also be expressed by a difference in the color of the arpeggio button 222.

A note limit is displayed in the note limit display region 223. The note limit is an example of parameter information and determines a range of pitches that can be produced. Specifically, if a pitch input through the performance operation portion 2 is out of the range set as the note limit, the part is not subjected to sound production. In the present example, the pitch that is the lower limit of the note limit and the pitch that is the upper limit are displayed as letters and numerical values, and a meter M1 that visually expresses the note limit is also displayed.

A velocity limit is displayed in the velocity limit display portion 224. The velocity limit is an example of parameter information and determines the range of velocities that can be subjected to sound production. Specifically, if a velocity input through the performance operation portion 2 is out of the range determined as the velocity limit, the corresponding part is not subjected to sound production. In the present example, the lower limit value and the upper limit value of the velocity limit are displayed, and a meter M2 visually expressing the velocity limit is also displayed.

The keyboard control button 225 is operated in order to switch the keyboard control function on and off When the keyboard control function is switched on, the corresponding function can be subjected to sound production through an operation of the performance operation portion 2 of FIG. 1. A mute button 226 is operated in order to switch the mute function on and off When the mute function is switched on, the corresponding part is not subjected to sound production. The solo button 227 is operated to switch a solo function on and off. When the solo function is switched on, only the corresponding part is subjected to sound production, and the other parts are not subjected to sound production. The on/off states of the functions at the current time may be displayed on the keyboard control button 225, the mute button 226, and the solo button 227, or the on/off states of the functions at the current time may also be expressed through differences in color of the keyboard control button 225, the mute button 226, and the solo button 227.

Hereinafter, the part name, the on/off state of the arpeggio function, the note limit, the velocity limit, the on/off state of the keyboard control function, the on/off state of the mute function, the on/off state of the solo function, and the volume, which are displayed in the part display regions 212a to 212d, will be referred to as "setting information". These pieces of setting information can be set by the user.

As shown in FIG. 3, a cursor CS for designating one piece of setting information is displayed in the part display regions 212a to 212d. The user can move the cursor CS to any position in the part display regions 212a to 212d and can designate a desired piece of setting information of a desired part. In the example shown in FIG. 3, the cursor CS is arranged in the note limit display portion 223 of the part display region 212a. In this case, the note limit of the part P1 has been designated.

(1-5) Example of Display in Additional Display Region

The information relating to at least one part of the selected part group is displayed in the additional display region 213 of FIG. 3. Hereinafter, the information displayed in the additional display region 213 will be referred to as "additional information". In the present example, the additional information corresponding to the setting information designated using the cursor CS is displayed in the additional display region 213.

Figure 5:
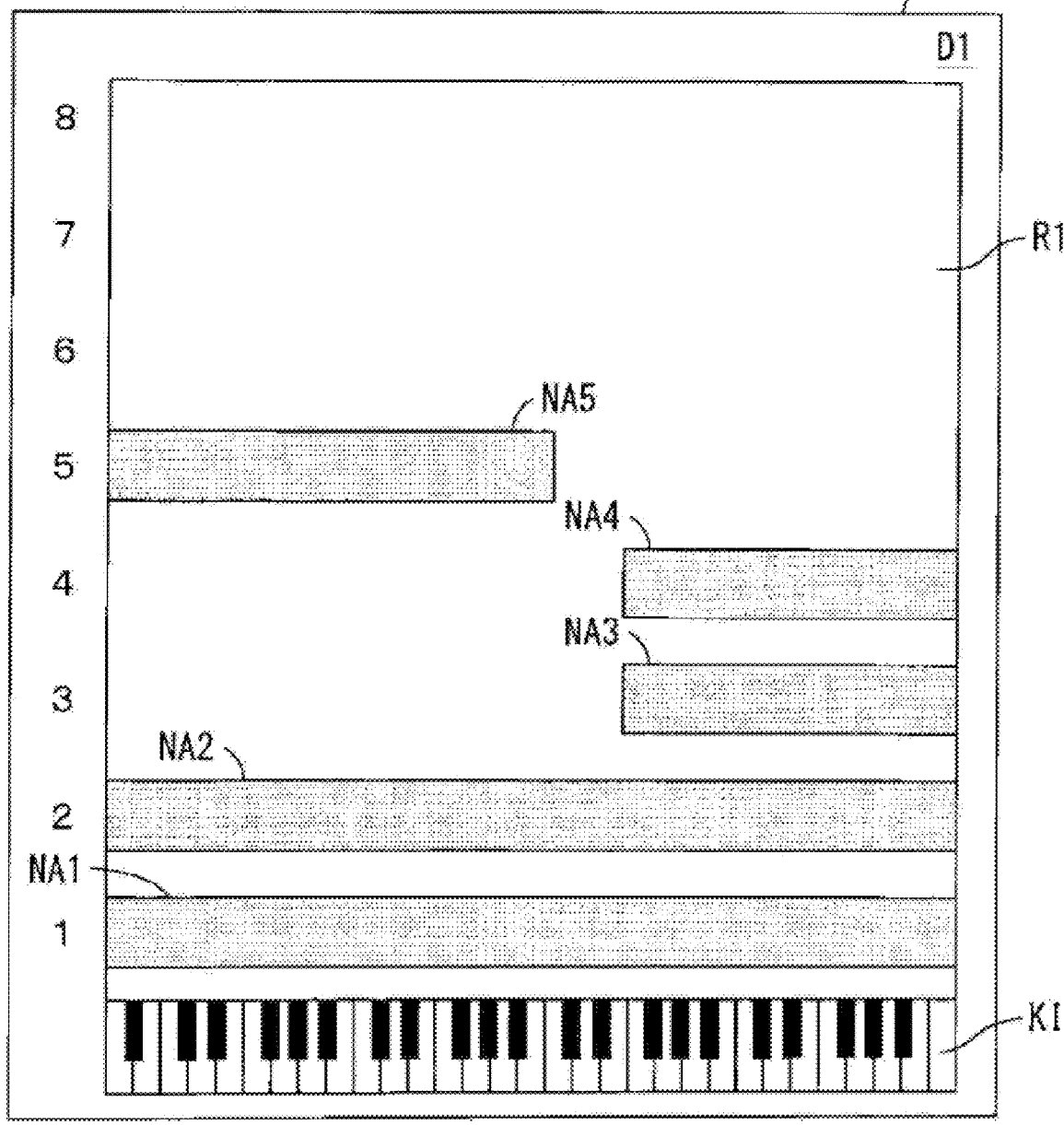
FIG. 5 is a diagram showing an example of display in an additional display region according to the first embodiment.

FIGS. 5 to 9 are diagrams showing display examples of the additional display region 213. FIG. 5 shows an example of a note limit screen D1 showing note limits of parts. If a note limit has been designated using the cursor CS in any part display region, the note limit screen D1 of FIG. 5 is displayed in the additional display region 213 as the additional information.

As shown in FIG. 5, the note limit screen D1 shows the note limits of the parts, in association with the keyboard. Specifically, a keyboard image KI is displayed below the note limit screen D1 and a note limit display region R1 is provided above the keyboard image KI. The horizontal axis of the note limit display region R1 indicates the pitches corresponding to the keys of the keyboard image KI. Rectangular note limit adjusters indicating the note limits of the parts to which timbres have been allocated are displayed in the note limit display region R1. Numbers indicating the parts corresponding to the note limit adjusters are displayed in the left portion of the note limit display region R1. In the present example, note limit adjusters NA1 to NA5 indicating the note limits of the parts P1 to P5 are displayed. The note limit adjusters NA1 to NA5 are examples of parameter adjusters. Note that the parts displayed in the note limit region R1 may also be changed due to a user dragging the left portion (the portion in which the numbers indicating the parts are displayed) of the note limit region R1 upward or downward. For example, on the note limit screen D1 of FIG. 5, if the user drags the left portion of the note limit region R1 downward, the information on parts P9 to P16 will be displayed in the note limit region R1.

The note limits indicated by the note limit adjusters NA1 to NA5 match the note limits of the parts displayed in the note limit display portions 223 (FIG. 4) of the part display regions 212a to 212d. The user can move each of the note limit adjusters NA1 to NA5 in the left-right direction and can adjust the widths of the note limit adjusters NA1 to NA5 in the left-right direction. Thus, the note limits of the parts are adjusted. When the positions or widths of the note limit adjusters NA1 to NA5 are changed, the note limits displayed in the note limit display portions 223 of the part display regions 212a to 212d are changed so as to comply with the change.

The pitches corresponding to the keys of the keyboard may also be changed for each part. For example, if the note limits of two parts are the same, when the pitches corresponding to the keys are the same for the two parts, the range of the keyboard corresponding to the note limit of one part is the same as the range of the keyboard corresponding to the note limit of the other part. For this reason, if the same channel is allocated to these two parts, different melodies cannot be played in the one part and the other part. In view of this, the pitches corresponding to the keys for these two parts are changed such that the range of the keyboard corresponding to the note limit of the one part and the range of the keyboard corresponding to the note limit of the other part are different. Accordingly, even if the same channel is allocated to these two parts, the one part and the other part can be performed independently, and different melodies can be played in the one part and the other part.

If the pitches corresponding to the keys are changed for any part, the positional relationship between the note limit adjuster and the keyboard image KI corresponding to the part may also be changed in the note limit screen D1 of FIG. 5. Specifically, the positional relationship between the note limit adjuster and the keyboard image KI is adjusted such that the range of the keyboard corresponding to the note limit of the part and the range of the keyboard image KI located directly below the note limit adjuster corresponding to the part match. In this case, the user can easily check the range of the keyboard corresponding to the note limit of the part by viewing the note limit screen D1.

Figure 6:
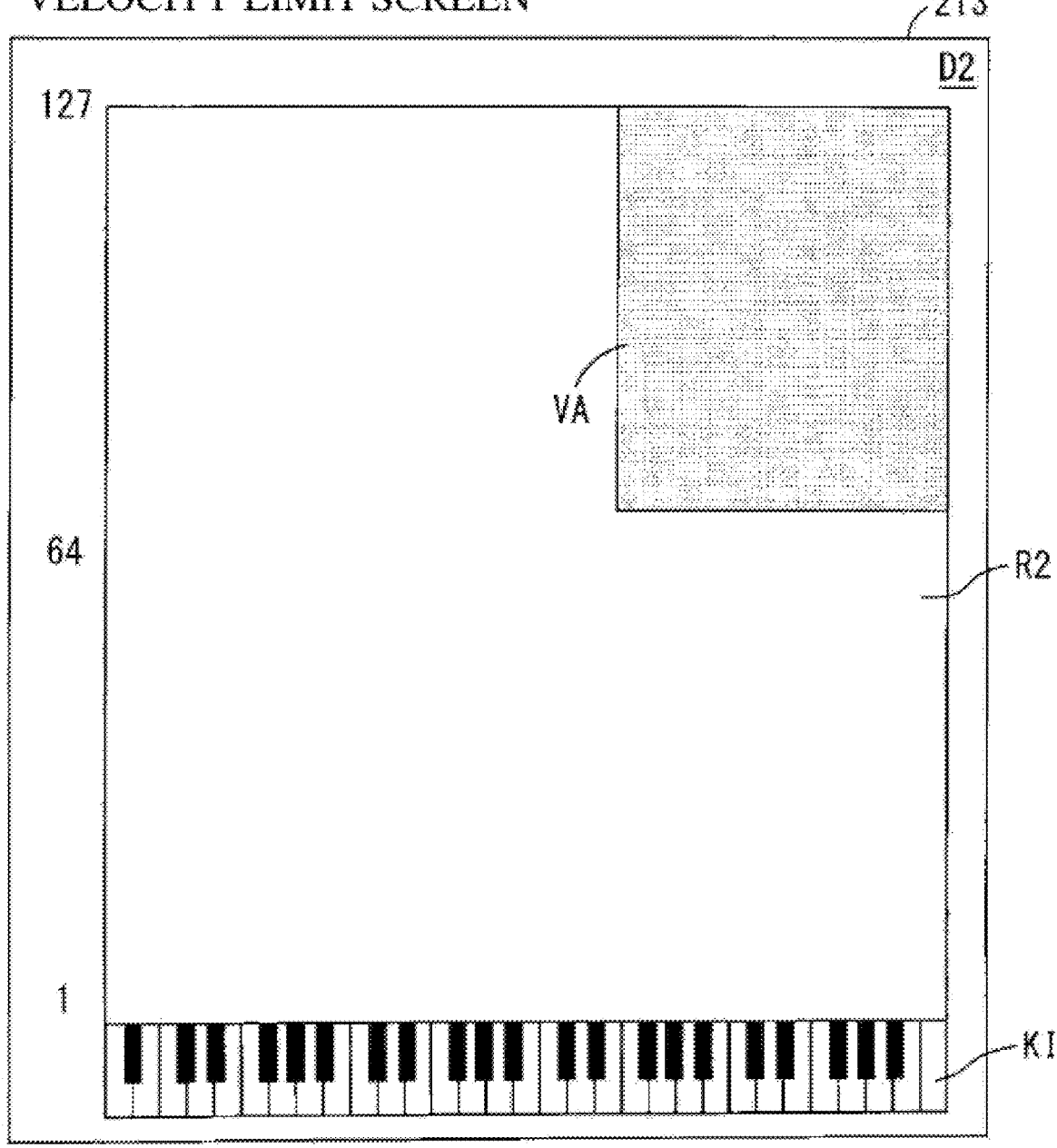
FIG. 6 is a diagram showing an example of display in an additional display region according to the first embodiment.

FIG. 6 shows an example of a velocity limit screen D2 showing a velocity limit of a part. If a velocity limit has been designated using the cursor CS in any part display region, the note limit screen D2 of FIG. 6 is displayed in the additional display region 213 as the additional information. For example, if the tab 211a of FIG. 3 has been selected and the velocity limit has been designated in the part display region 212a, the velocity limit screen D2 is displayed in the additional display region 213, and the velocity limit of the part P1 is shown on the velocity limit screen D2.

As shown in FIG. 6, the velocity limit screen D2 shows the velocity limit of the part in association with the keyboard. Specifically, the keyboard image KI is displayed at the lower portion of the velocity limit screen D2, and a velocity limit display region R2 is provided above the keyboard image KI. The horizontal axis of the velocity limit display region R2 indicates the pitches corresponding to the keys of the keyboard image KI, and the vertical axis indicates the velocity. A rectangular velocity limit adjuster VA indicating the velocity limit of the part is displayed in the velocity limit display region R2. The velocity limit adjuster VA is an example of a parameter adjuster.

The velocity limit indicated by the velocity limit adjuster VA matches the velocity limit displayed in the velocity limit display portion 224 (FIG. 4) in the corresponding part display region. The user can move the velocity limit adjuster VA in the vertical direction, and can adjust the vertical width of the velocity limit adjuster VA. Accordingly, the velocity limit of the corresponding part is adjusted. When the position and the vertical width of the velocity limit adjuster VA are changed, the velocity limit displayed in the velocity limit display portion 224 of the corresponding part display region is changed so as to comply with the velocity limit adjuster VA.

The velocity limit adjuster VA may also be moved in the left-right direction. Also, the width in the left-right direction of the velocity limit adjuster may be adjusted. In this case, the note limit of the corresponding part can be adjusted in the same manner as the operation of the note limit adjuster on the note limit screen D1 of FIG. 5. Also, in the example of FIG. 6, only one velocity limit adjuster VA is displayed in the velocity limit display region R2, but multiple velocity limit adjusters VA indicating the velocity limits of multiple parts may also be displayed in the velocity limit display region R2. In this case, the multiple velocity limit adjusters VA may also be displayed in mutually different colors in order to identify the velocity limit adjusters VA corresponding to the parts.

Figure 7:
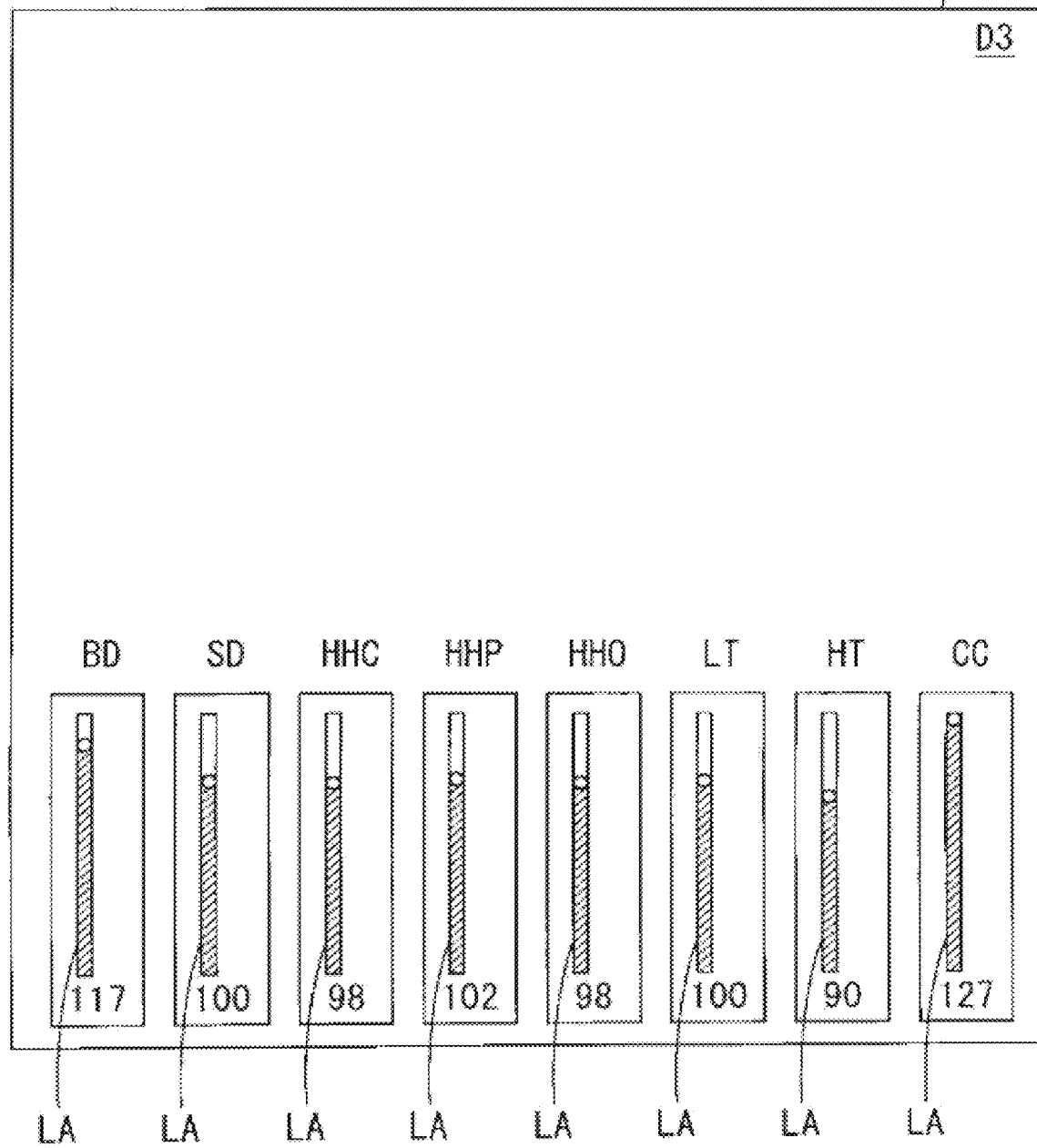
FIG. 7 is a diagram showing an example of display in an additional display region according to the first embodiment.

FIG. 7 shows an example of a drum screen D3 indicating output levels of parts (drum parts) to which drums are allocated as timbres. The drum screen D3 of FIG. 7 is displayed in the additional display region 213 as the additional information if, for example, a part name has been designated using the cursor CS in a part display region corresponding to a drum part.

Regarding the drum parts, different percussion instrument sounds are allocated to multiple keys of the keyboard, and when a key is pressed, the percussion instrument sound corresponding to the key is produced. In this case, the key that is pressed and the pitch of the percussion instrument sound that is produced do not correspond to each other.

The drum screen D3 of FIG. 7 includes multiple drum key level adjusters LA. The multiple drum key level adjusters LA respectively indicate the output levels (volumes) of the multiple percussion instrument sounds allocated to the multiple keys. Letters indicating the corresponding percussion instrument names are displayed above the drum key level adjusters LA. For example, "BD" indicates a bass drum and "SD" indicates a snare drum. The user can adjust the output levels of the corresponding percussion instrument sounds by operating the drum key level adjusters LA.

Figure 8:
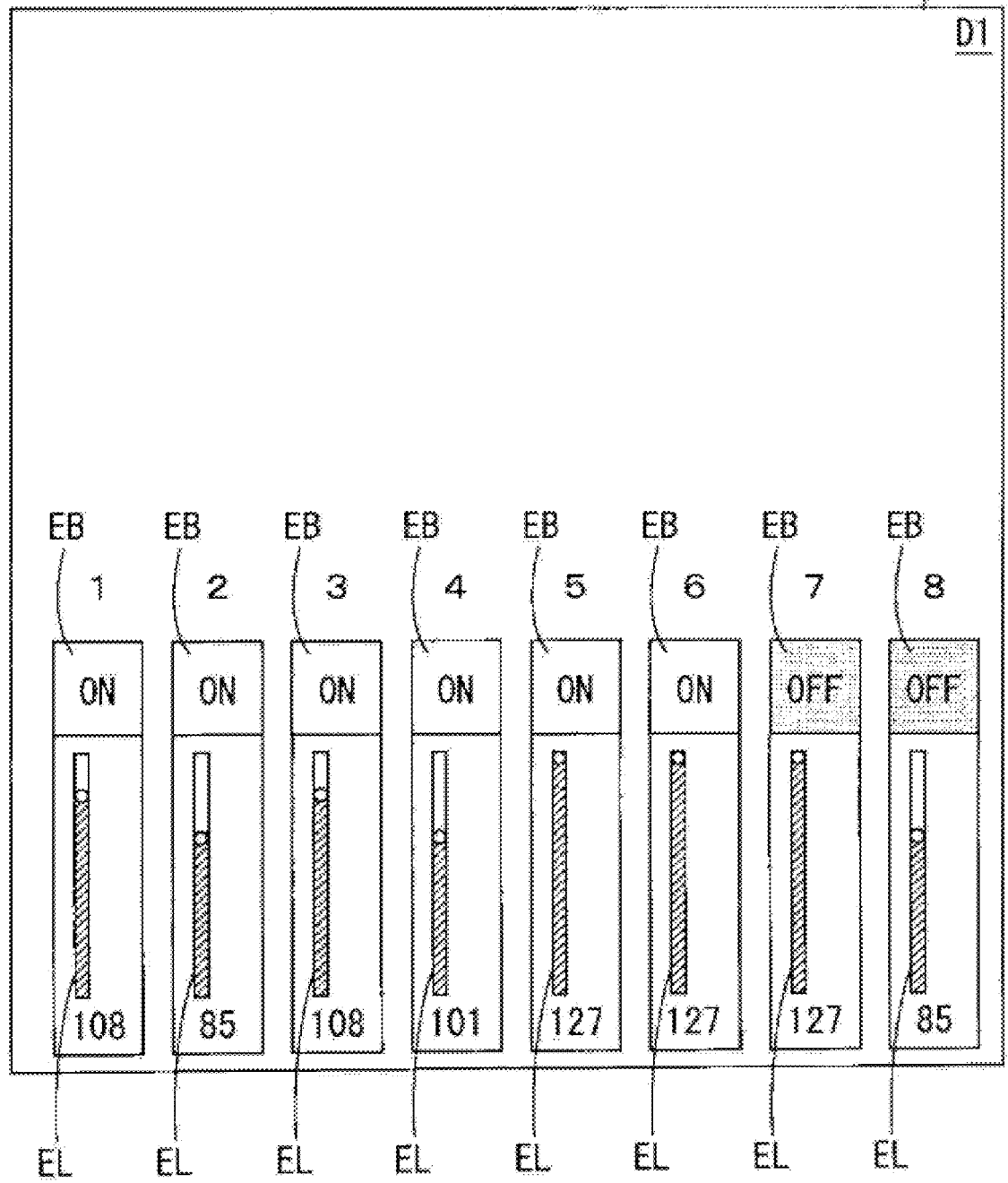
FIG. 8 is a diagram showing an example of display in an additional display region according to the first embodiment.

FIG. 8 shows an example of an element screen D4 showing output levels of elements in a normal part. In a part to which a piano sound, a guitar sound, or the like has been allocated as the timbre, when any key of the keyboard is pressed, a sound with the pitch corresponding to that key is produced. A part in which a sound with a pitch corresponding to a pressed key is produced is referred to as a normal part, as distinguished from a drum part. A normal part in which a timbre obtained through PCM (Pulse Code Modulation) is allocated is constituted by multiple elements. Each element is generated by applying a parameter to a waveform that is the basic component of the sound. The element screen D4 of FIG. 8 is displayed in the additional display region 213 as the additional information if, for example, a part name has been designated by the cursor CS in the part display region corresponding to a normal part to which a timbre obtained through PCM has been allocated.

The element screen D4 of FIG. 8 includes eight on/off buttons EB corresponding to eight elements constituting the normal part, and eight element level adjusters EL. Numbers indicating the corresponding elements are displayed above the on/off buttons EB. The user can switch the elements on and off by operating the on/off buttons EB. The multiple element level adjusters EL respectively indicate the output levels of the elements. The user can adjust the output levels of the elements by operating the element level adjusters EL.

Figure 9:
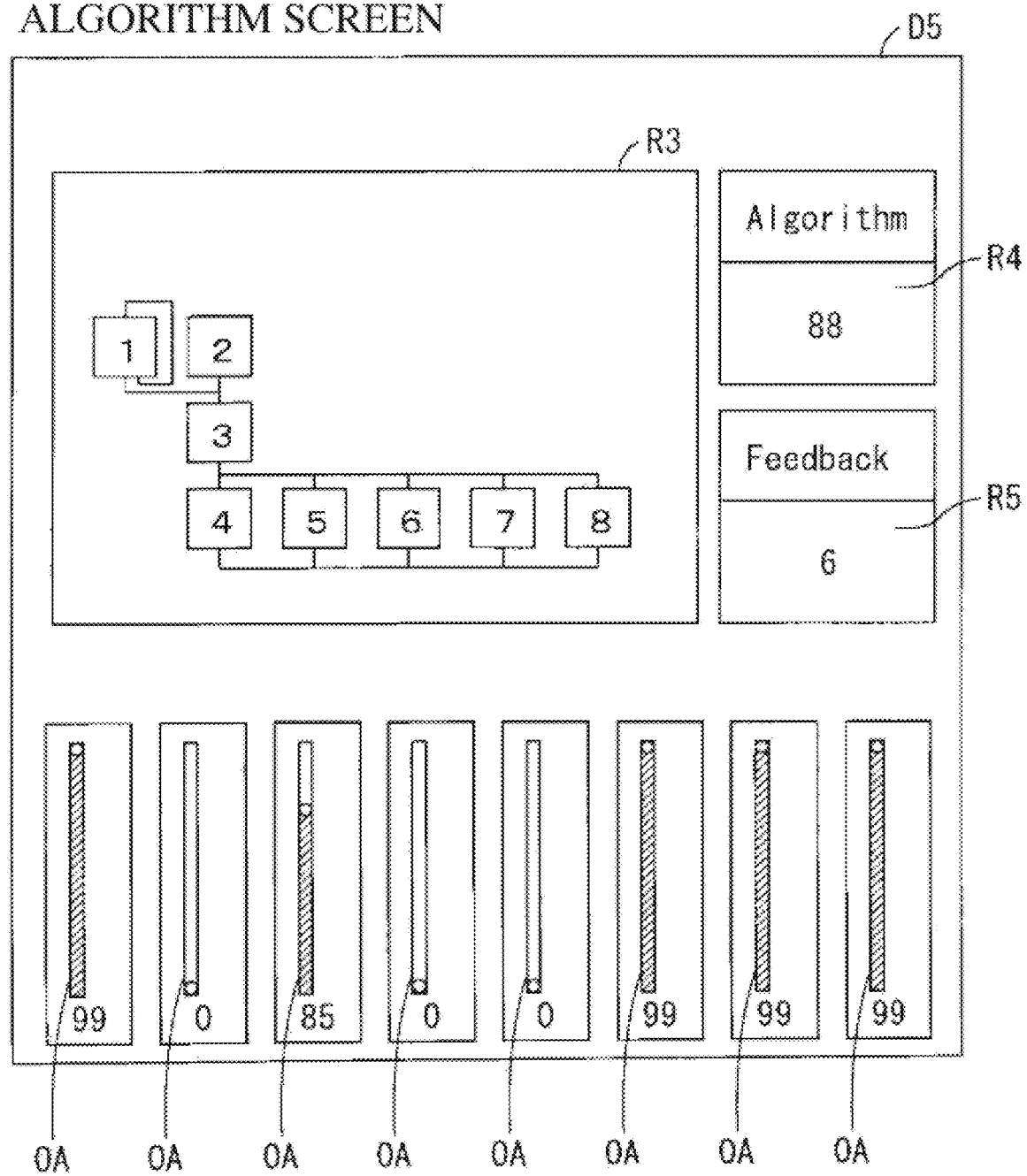
FIG. 9 is a diagram showing an example of display in an additional display region according to the first embodiment.

FIG. 9 shows an example of an algorithm screen D5 indicating an algorithm of a normal part. A timbre obtained through FM (frequency modulation) depends on how multiple operators (FM synthesizers) are aligned. How these multiple operators are aligned is referred to as an "algorithm". The algorithm screen D5 of FIG. 9 is displayed in the additional display region 213 as the additional information if, for example, a part name has been designated by the cursor CS in the part display region corresponding to a normal part to which a timbre obtained through FM has been allocated.

The algorithm screen D5 of FIG. 9 includes an algorithm display region R3, an algorithm number display region R4, a feedback level display region R5, and multiple operator level adjusters OA. The user can select any algorithm from multiple algorithms stored in advance. A schematic diagram indicating the selected algorithm is displayed in the algorithm display region R3. An algorithm number, which is the identification number of the selected algorithm, is displayed in the algorithm number display region R4. The feedback level indicating the level of feedback is displayed in the feedback level display region R5. "Feedback" means modulating a modulator using an the output waveform of a carrier modulated by the modulator. The operator level adjusters OA indicate the output levels of the operators. The user can adjust the output levels of the operators by adjusting the operator level adjusters OA.

(1-5) Switching of Performance Screen

Figure 10:
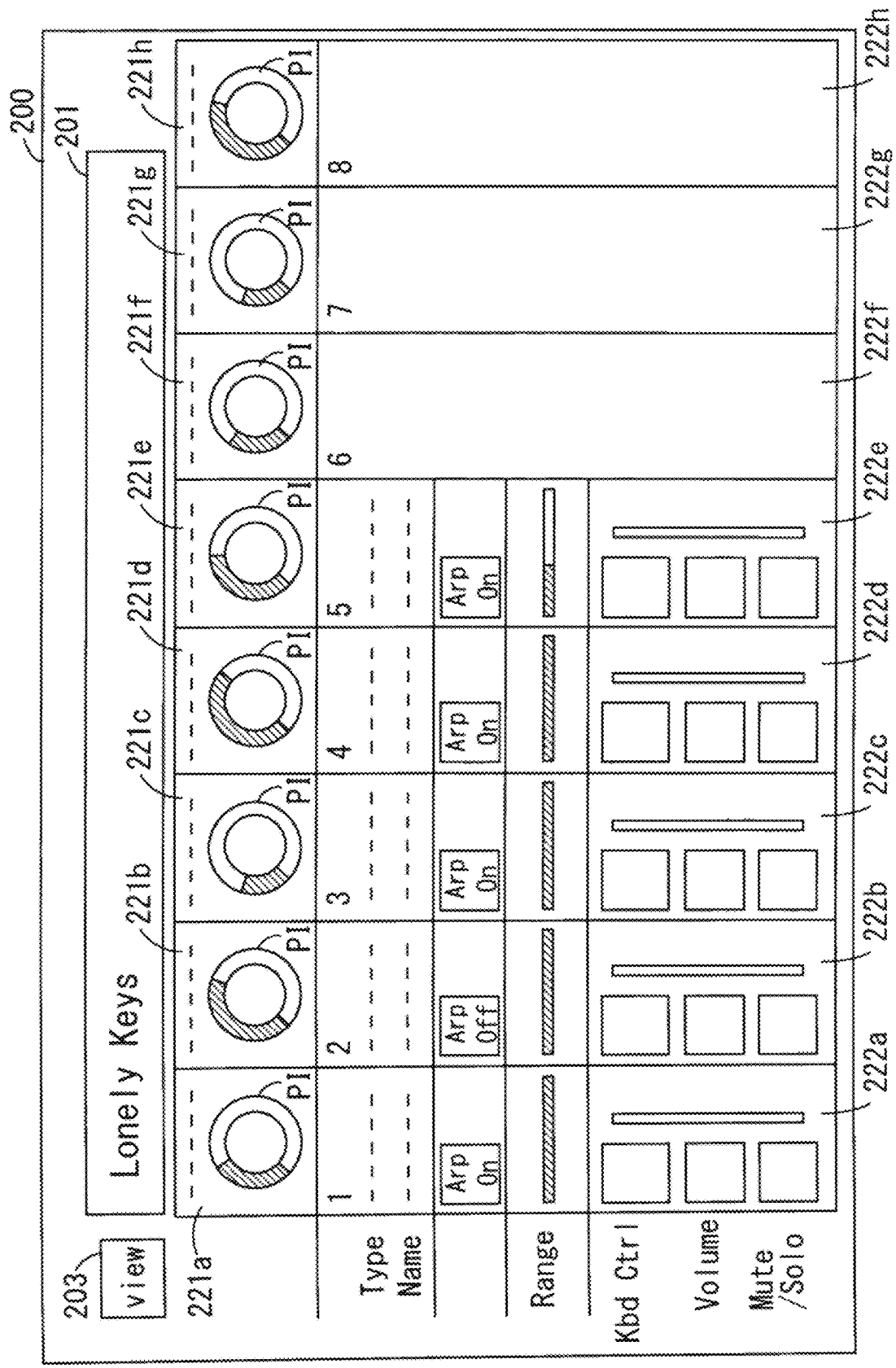
FIG. 10 is a diagram showing an example of switching a performance screen according to the first embodiment.

FIG. 10 is a diagram showing an example of switching the performance screen 200. When the display switch button 203 is operated on the performance screen 200 of FIG. 3, for example, the performance screen 200 of FIG. 10 is displayed. Differences between the performance screen 200 of FIG. 10 and the performance screen 200 of FIG. 3 will be described.

The performance screen 200 of FIG. 10 includes knob display regions 221a to 221h and part display regions 222a to 222h, instead of the tabs 211a to 211d, the part display regions 212a to 212d, and the additional display region 213.

The setting adjuster 4 of FIG. 1 includes eight knobs (not shown). The knob display regions 221a to 221h respectively correspond to the eight knobs. The knob display regions 221a to 221h respectively display the types of the parameters allocated to the corresponding knobs, and parameter images PI resembling knobs are displayed. The parameter images PI indicate the values of the parameters allocated to the corresponding knobs. The user can change the values of the parameters allocated to the knobs by operating the parameter images PI in the knob display regions 221a to 221h.

The part display regions 222a to 222h have the same configurations as the part display regions 212a to 212d of FIG. 3, except that one of the note limit display portion 223 (FIG. 4) and the velocity limit display portion 224 (FIG. 4) is not included. In the example shown in FIG. 10, the information relating to the parts P1 to P8 is displayed in the part display regions 222a to 222h. Note that since timbres have not been allocated to the parts P6 to P8, the part display regions 222f to 222h are subjected to blank display.

The information relating to the parts P9 to P12 is displayed in the part display regions 202a to 202h instead of the information relating to the parts P1 to P8 due to a setting operator 4 of FIG. 1 or a switch button (not shown) displayed in the performance screen 200 being operated. In the performance screen 200 of FIG. 10, when the display switch button 203 is operated, the performance screen of FIG. 3 is once again displayed.

Unlike the performance screen 200 of FIG. 3, on the performance screen 200 of FIG. 10, the user can simultaneously check the setting information of five or more parts. The user can perform various types of settings of the performance mode in various forms by switching the performance screen 200 as needed.

(1-6) Functional Configuration of Electronic Music Apparatus

Figure 11:
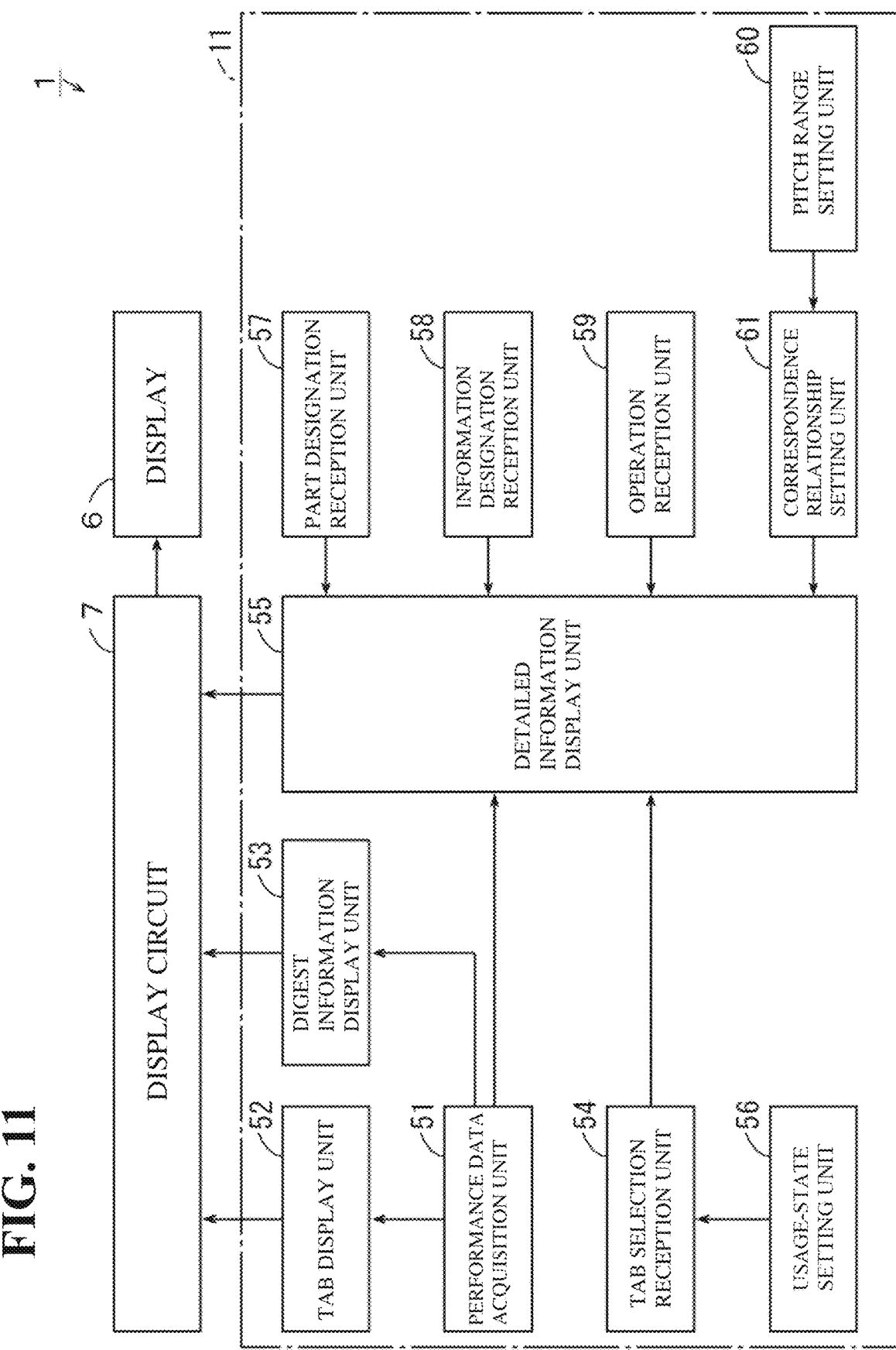
FIG. 11 is a block diagram showing a functional configuration of the electronic music apparatus shown in FIG. 1.

FIG. 11 is a block diagram showing a functional configuration of the electronic music apparatus 1 of FIG. 1. As shown in FIG. 11, the electronic music apparatus 1 includes a performance data acquisition unit 51, a tab display unit 52, a digest information display unit 53, a tab selection reception unit 54, a detailed information display unit 55, a usage-state setting unit 56, a part designation reception unit 57, an information designation reception unit 58, an operation reception unit 59, a pitch range setting unit 60, and a correspondence relationship setting unit 61. The functions of the units of the electronic music apparatus 1 in FIG. 11 are realized by the CPU 11 of FIG. 1 executing a part display program stored in the ROM 10 or the storage apparatus 13.

The performance data acquisition unit 51 acquires the selected performance data from the storage apparatus 13 of FIG. 1. The tab display unit 52 displays the multiple tabs 211a to 211d corresponding to the multiple part groups G1 to G4 by controlling the display circuit 7. The tab display unit 52 may also adjust the number of tabs to be displayed as needed based on the number of parts included in the acquired performance data, or the like. By controlling the display circuit 7, the digest information display unit 53 displays the digest information of the parts of the corresponding part group, superimposed on the multiple displayed tabs 211a to 211d. The digest information is obtained from the performance data acquired by the performance data acquisition unit 51.

The tab selection reception unit 54 receives the selection of one of the multiple displayed tabs 211a to 211d. For example, the selection of a tab is received by the user operating the setting adjuster 4 of FIG. 1 to select one tab. Alternatively, if at least a portion of the display 6 and the setting operator 4 is constituted by a touch panel display, the selection of the tab is received by the user touching one tab on the touch panel display.

The detailed information display unit 55 displays a part detail screen PD including detailed information of the part group corresponding to the selected tab by controlling the display circuit 7. As described above, the part detail screen PD includes the part display regions 212a to 212d and the additional display region 213. Also, the detailed information includes the multiple pieces of setting information displayed in the part display regions 212a to 212d and the additional information displayed in the additional display region 213. The detailed information is obtained from the performance data acquired by the performance data acquisition unit 51.

The usage-state setting unit 56 sets the parts of the multiple part groups G1 to G4 to be in use or not in use. The part designation reception unit 57 receives the designation of at least one part among the multiple part groups G1 to G4. For example, the designation of the part is received due to the user moving the cursor CS on the performance screen 200 of FIG. 3 to one of the part display regions 212a to 212d. Also, a designation operator that can designate a part may be provided as the setting operator 4 of FIG. 1 and the designation of a part may be received through an operation of the designation operator. In this case, it is also possible to designate a part corresponding to a tab that has not been selected. If a part corresponding to a tab that has not been selected is designated using the designation operator, the selection of the tab corresponding to the designated part instead of the tab that had been selected may be received by the tab selection reception unit 54.

The information designation reception unit 58 receives the designation of any one of the multiple pieces of setting information in the part display region corresponding to the designated part. For example, the designation of the setting information is received due to the user moving the cursor CS of FIG. 3 to a position corresponding to any piece of setting information. The operation reception unit 59 receives the operation of the parameter adjuster in the additional display region 213.

The pitch range setting unit 60 sets the pitch range (note limit) for each part. For example, the pitch range is set for each part due to the user operating the note limit adjusters on the note limit screen D1 of FIG. 5. The correspondence relationship setting unit 61 sets the correspondence relationship between the set pitch range and the multiple pitch operators (keys). As described above, if the correspondence relationship between the keys of the keyboard and the pitches is changed, the correspondence relationship between the pitch range and the multiple keys is also changed accordingly.

(1-7) Part Display Processing

Figure 12:
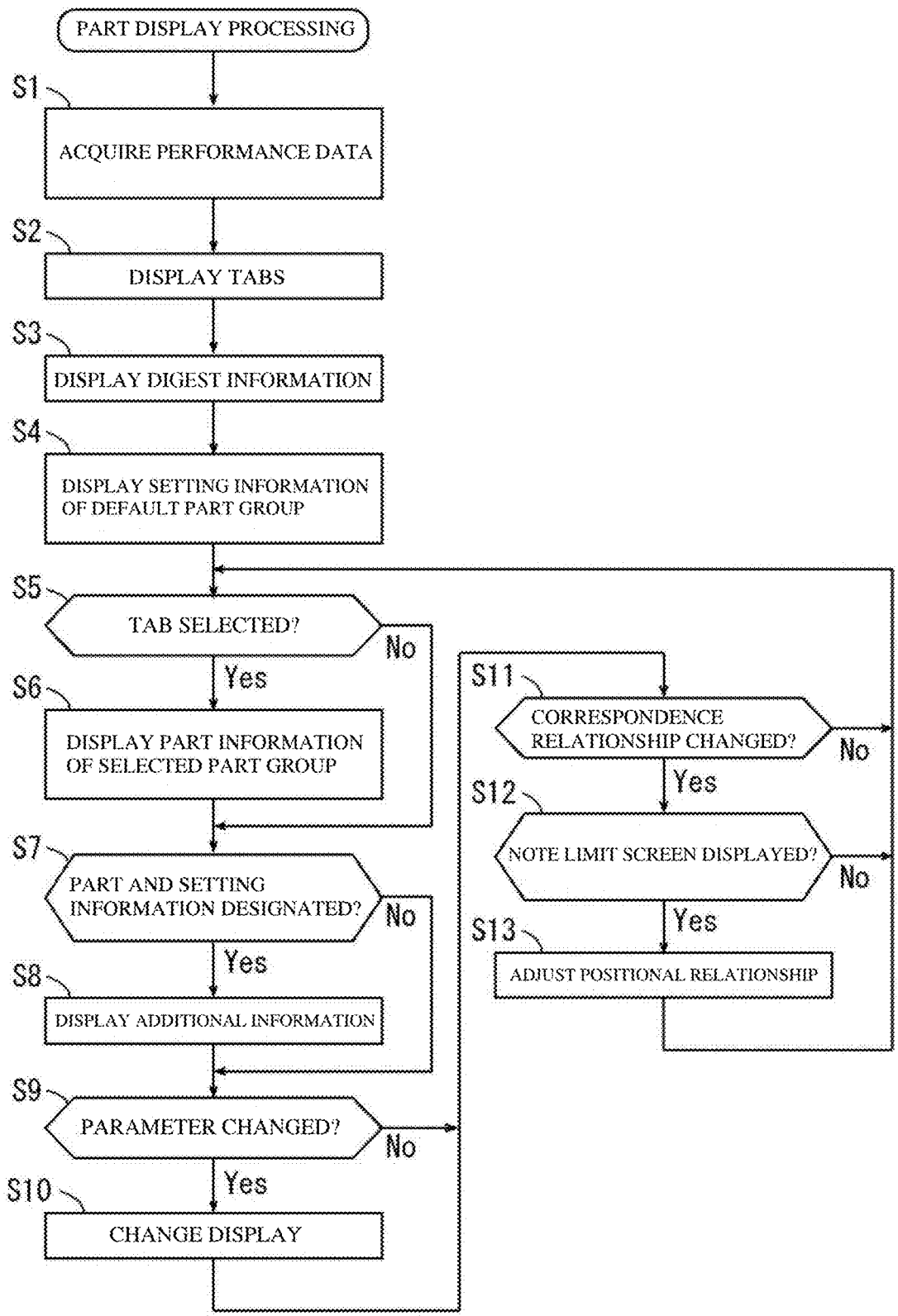
FIG. 12 is a flowchart showing an example of part display processing of the electronic music apparatus of FIG. 1.

FIG. 12 is a flowchart showing an example of part display processing of the electronic music apparatus 1 of FIG. 1. The part display processing of FIG. 12 is performed by the CPU 11 of FIG. 1 executing the part display program stored in the ROM 10 or the storage apparatus 13.

First, the performance data acquisition unit 51 acquires the selected performance data from the storage apparatus 13 of FIG. 1 (step S1). Next, the tab display unit 52 displays the multiple tabs 211a to 211d corresponding to the multiple part groups G1 to G4 (step S2). Next, the digest information display unit 53 displays the digest information (identification marks d1 to d16 in FIG. 3) of the parts by superimposing them on the multiple tabs based on the acquired performance data (step S3). Next, the detailed information display unit 55 displays the setting information of the default part group in the multiple part display regions based on the acquired performance data (step S4). In the example shown in FIG. 3, the default part group is, for example, the part group G1.

Next, the tab selection reception unit 54 determines whether or not a tab has been selected by the user (step S5). If a tab has been selected, the detailed information display unit 55 displays the setting information of the part group corresponding to the selected tab in the multiple part display region (step S6). If a tab has not been selected, step S6 is skipped.

Next, the part designation reception unit 57 and the information designation reception unit 58 determine whether or not a part and a piece of setting information have been designated by the user (step S7). If a part and a piece of setting information are designated, the detailed information display unit 55 displays the additional information relating to the designated part and the designated setting information in the additional display region (step S8). If a part and a piece of setting information have not been designated, step S8 is skipped.

Next, the operation reception unit 59 determines whether or not a parameter of a piece of setting information has been changed through an operation of a parameter adjuster displayed in the additional display region 213 (step S9). If the parameter adjuster has been operated, the detailed information display unit 55 changes the parameter of the corresponding piece of setting information displayed in the part display regions 212a to 212d so as to comply with the change to the parameter performed through the operation of the parameter adjuster (step S10). If the parameter adjuster has not been operated, step S10 is skipped.

Next, the correspondence relationship setting unit 61 determines whether or not the correspondence relationship between the note limit and the multiple pitch designators (keys) has been changed for a part (step S11). If the correspondence relationship has been changed, the detailed information display unit 55 determines whether or not the note limit screen D1 is being displayed in the additional display region 213 (step S12). If the note limit screen D1 is being displayed, the detailed information display unit 55 adjusts the positional relationship between the note limit adjuster and the keyboard image KI on the note limit screen D1 so as to comply with the change in the correspondence relationship. Thereafter, the tab selection reception unit returns to step S5. If the correspondence relationship has not been changed in step S11, or if the note limit screen D1 is not being displayed in step S12, step S10 is skipped, and the tab selection reception unit returns to step S5.

Due to the processing of this example, the performance screen 200 of FIG. 3 is displayed on the display 6 and various types of operations on the displayed performance screen 200 are possible.

(1-8) Effect of the Embodiment

With the electronic music apparatus 1 according to the present embodiment, when any one of the multiple tabs 211a to 211d is selected, various types of information of the part group corresponding to the selected tab are displayed on the performance screen 200. Accordingly, the information of the desired part group can be displayed in a limited amount of space. Also, the digest information of the parts of the corresponding part group is displayed superimposed on the respective tabs 211a to 211d. Thus, by viewing an unselected tab, the user can check the digest information of the parts corresponding to the tab. Accordingly, even if there is a large number of parts included in the performance data, the information of the parts can be easily checked without sacrificing the convenience.

Also, in the present embodiment, information indicating whether or not the parts of the part groups corresponding to the tabs are in use is displayed as the digest information. Accordingly, the user can easily check whether the parts corresponding to an unselected tab are in use or not in use.

Also, in the present embodiment, the setting information of the part group corresponding to the selected tab is displayed in the part display regions 212a to 212d of the performance screen 200. Accordingly, the user can easily check the setting information of the parts corresponding to the selected tab.

Also, in the present embodiment, the additional information relating to at least one part is displayed in the additional display region 213 of the performance screen 200. Thus, the user can efficiently check the setting information of the parts corresponding to the selected tab and the additional information relating to at least one part on a common screen.

Also, in the present embodiment, the desired part and the desired setting information are designated using the cursor CS in the part display regions 212a to 212d, and the additional information corresponding to the designated part and setting information is displayed in the additional display region 213. Accordingly, the user can cause the additional information corresponding to the desired setting information of the desired part to be displayed in the additional display region 213 without performing a complicated operation.

Also, in the present embodiment, when the parameter adjuster is operated in the additional display region 213, the parameters of the setting information in the part display regions 212a to 212d are changed so as to comply with the operation. Thus, the user can, without error, check the adjusted parameters in the part display regions 212a to 212d and the additional display region 213.

(2) Second Embodiment

(2-1) Overall Configuration of Acoustic System

Figure 13:
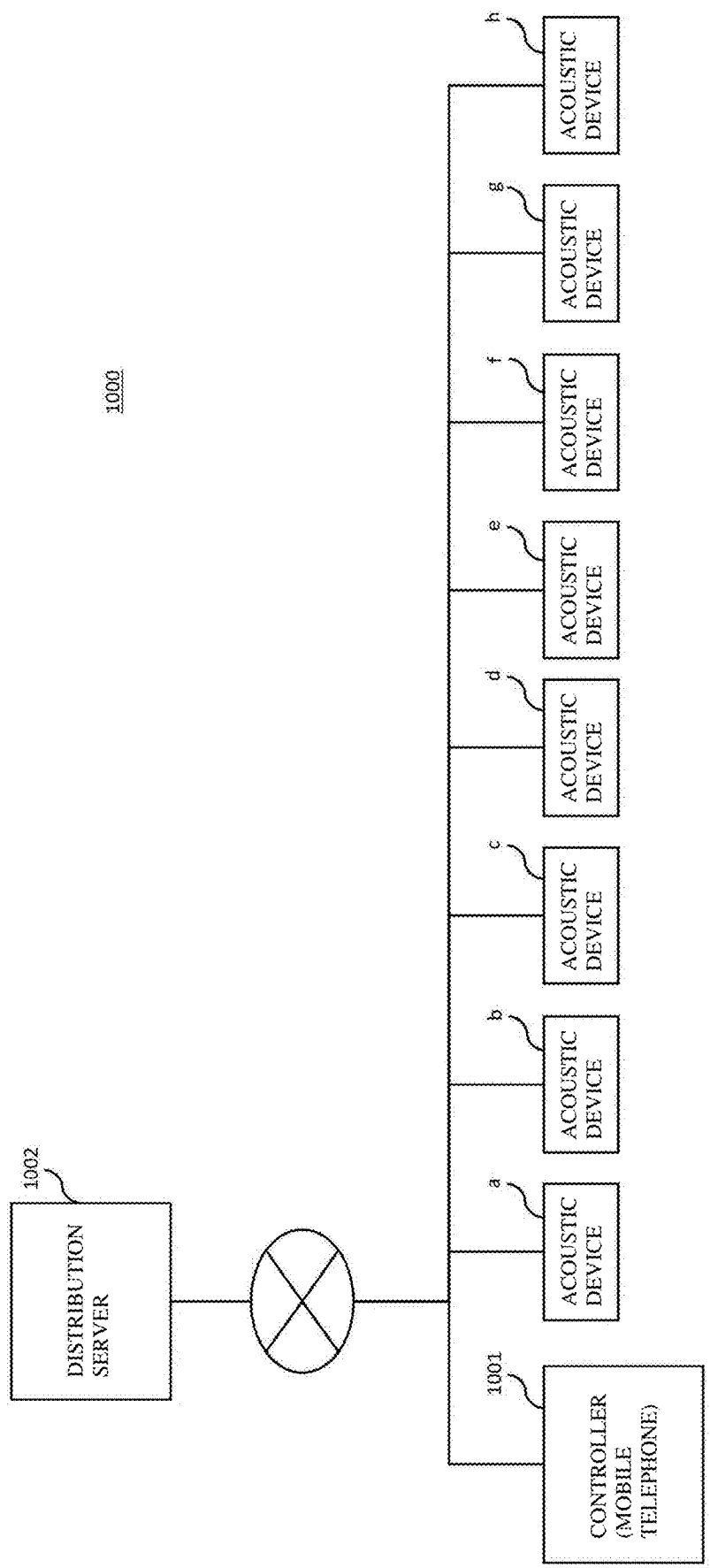
FIG. 13 is a block diagram showing a configuration of an acoustic system according to a second embodiment.

FIG. 13 is block diagram showing a configuration of an acoustic system 1000 including the part display apparatus according to the present embodiment. The acoustic system 1000 of FIG. 13 includes multiple acoustic devices a to h and a controller 1001 connected to the acoustic devices a to h. The acoustic devices a to h have a communication function and can communication with another device such as the controller 1001, which also has a communication function. The controller 1001 sets the setting information of the acoustic devices a to h and controls the operations of the acoustic devices a to h accordingly. The setting information in this context relates to, for example, the name, model name, on/off state, equalizer, volume, and the like of the device. These pieces of setting information can be set as appropriate by the user operating the controller 1001. The acoustic system 1000 further includes a distribution server 1002 for distributing musical piece data to the acoustic devices a to h. The acoustic devices a to h and the controller 1001 can receive provision of the musical piece data from the distribution server 1002. Also, the acoustic devices a to h can receive provision of the musical piece data from the controller 1001. The method for connecting the distribution server 1002, the controller 1001, and the acoustic devices a to h is not particularly limited, but in the present embodiment, they are connected via the Internet.

The acoustic devices a to h are arranged divided in various rooms (areas) in the same building. In the present embodiment, there are three rooms A to C in one building, the acoustic devices a to c are arranged in the room A, the acoustic devices d to f are arranged in the room B, and the acoustic devices g and h are arranged in the room C. However, the acoustic devices a to h may also be arranged divided in multiple buildings, and one acoustic device may be arranged in one room (area).

(2-2) Configuration of Controller

Figure 14:
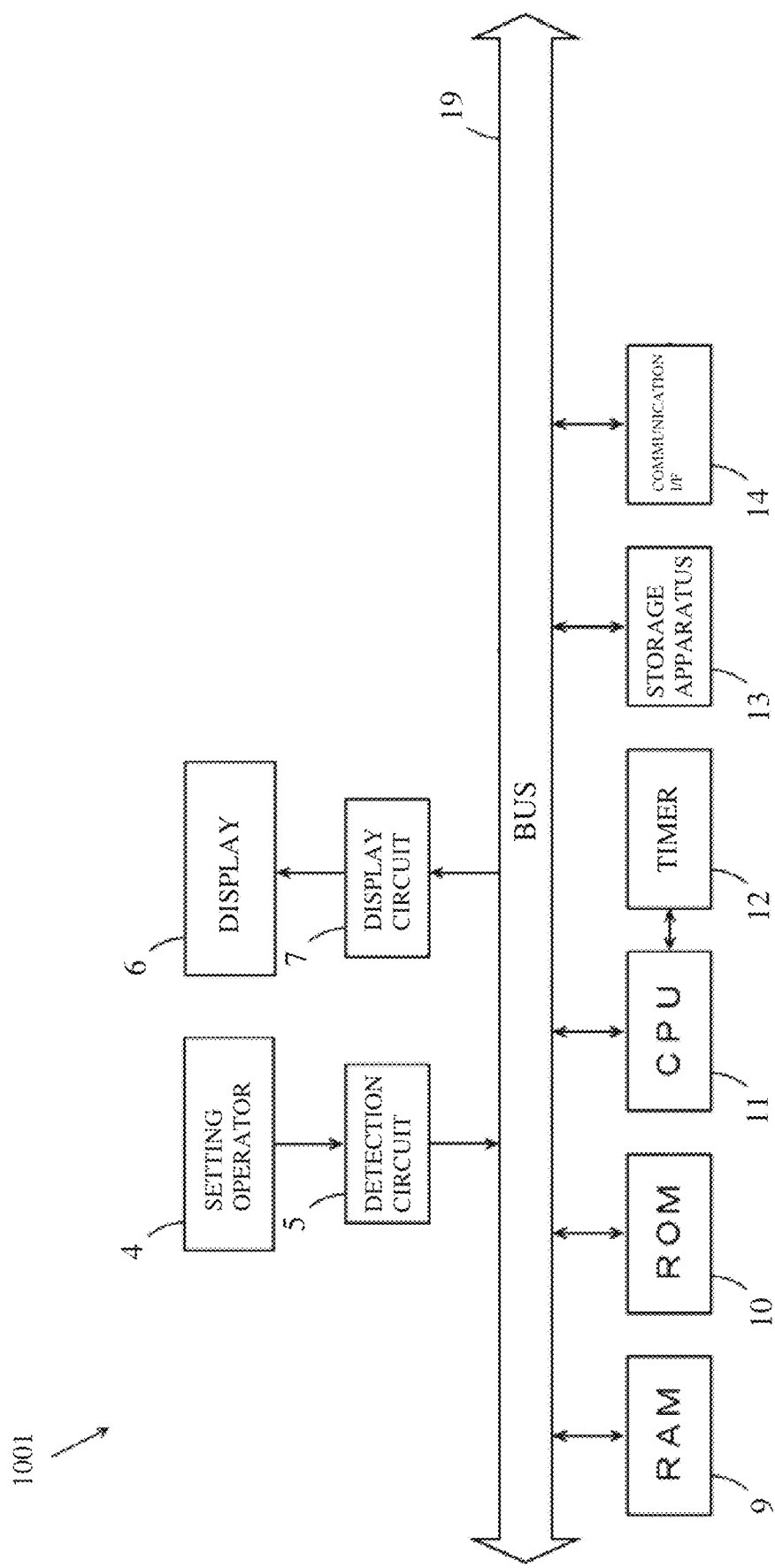
FIG. 14 is a block diagram showing a configuration of a controller according to the second embodiment.

The controller 1001 according to the present embodiment is a mobile telephone (smartphone) in which a predetermined application program (including the part display program according to the present embodiment) is installed. However, the hardware configuration of the controller 1001 is not limited to this example, and for example, can be realized as any form of computer, such as a tablet computer, a desktop computer, or a laptop computer. As shown in FIG. 14, the controller 1001 includes a setting operator 4, a detection circuit 5, a display 6, a display circuit 7, a RAM 9, a ROM 10, a CPU 11, a timer 12, a storage apparatus 13, a communication I/F 14, and a bus 19. These elements 4 to 7, 9 to 14, and 19 fulfill the same roles as the elements denoted by the same reference numerals in the first embodiment.

In the present example, the setting operator 4 is realized as an operation key, a touch panel overlaid on the display 6, or the like, and is connected to a bus 19 via the detection circuit 5. The setting operator 4 is used to perform various types of setting of the acoustic devices a to h. The display 6 is connected to the bus 19 via the display circuit 7. Information relating to the various settings of the acoustic devices a to h are displayed on the display 6.

The physical configurations of the RAM 9, the ROM 10, the CPU 11, the timer 12, and the storage apparatus 13 are similar to those of the first embodiment, and these elements 9 to 13 are connected to the bus 19. The CPU 11 operates as the part display apparatus by executing a part display program stored in the ROM 10 or the storage apparatus 13 on the RAM 9, and executes the part display processing. The communication I/F 14 is also connected to the bus 19 and is connected to a wireless communication line such as Wi-Fi, Bluetooth (registered trademark), or a 3G/4G line, or to a wired communication line.

Management information (hereinafter referred to as part management information) relating to the acoustic devices a to h and the rooms in which the acoustic devices a to h are arranged is stored in the storage apparatus 13. Attribute information such as an ID number, name, and model name of the acoustic device, and the ID number of the room that is the installation location are stored in association with each acoustic device as the part management information. The part management information is set as needed due to the user operating the setting operator 4. Also, musical piece data and the like that can be provided to the acoustic devices a to h is also stored in the storage apparatus 13.

(2-3) Configuration of Acoustic Devices

The acoustic devices a to h of the present embodiment are AV (audio-visual) devices, and among them, the acoustic device a is a monaural speaker, the acoustic device b is a stereo speaker, and the acoustic device c is an AV receiver. That is, the acoustic system 1000 can include various types of acoustic devices. Note that a PA (public address) device may also be used as an acoustic device.

Figure 15:
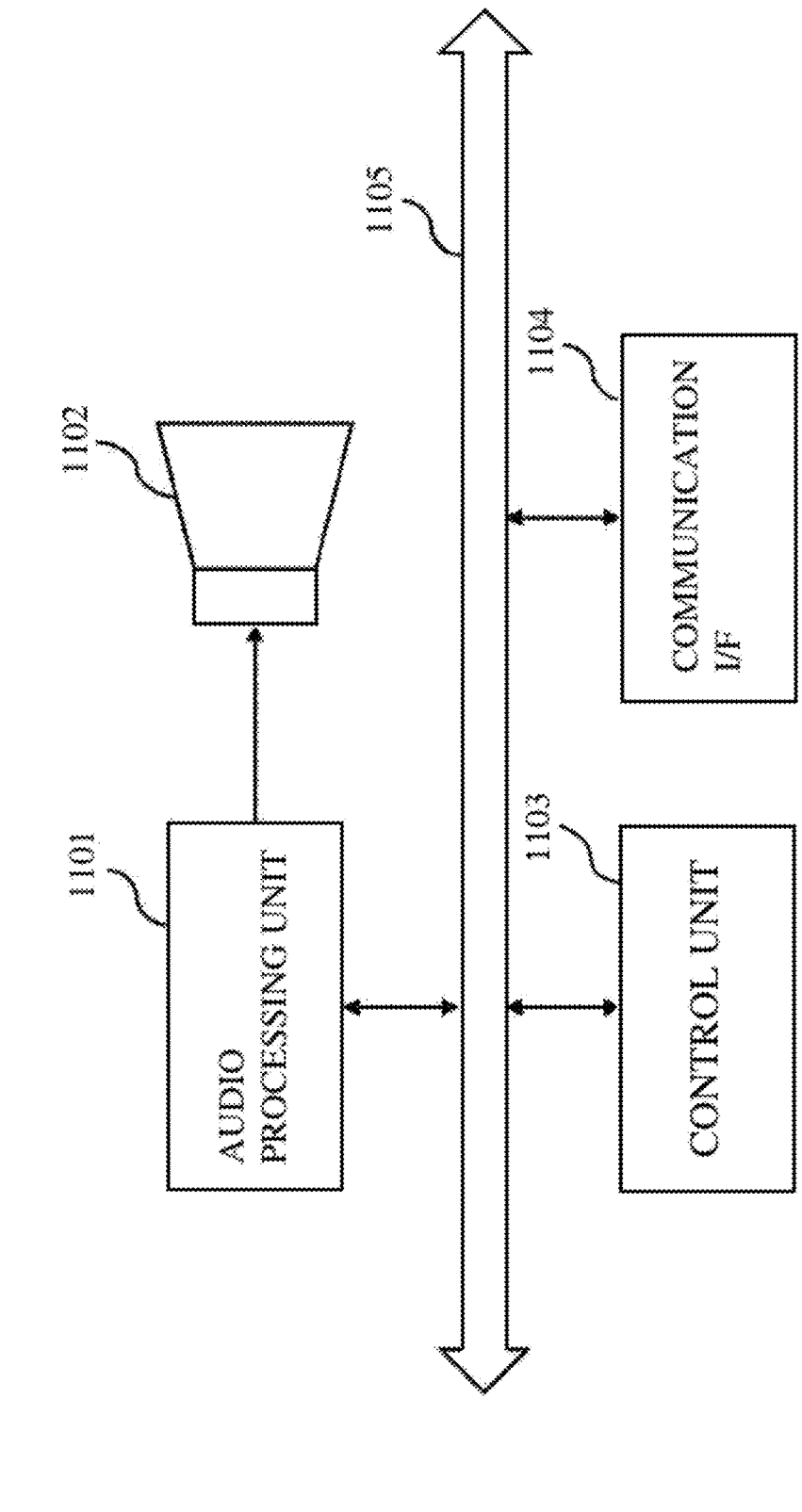
FIG. 15 is a block diagram showing a configuration of an acoustic device according to the second embodiment.

Hereinafter, the configuration of the acoustic devices will be described taking the acoustic device a as an example, with reference to FIG. 15, but description is the same for the acoustic devices b to h as well. The acoustic device a according to the present embodiment has a function of reproducing musical piece data, includes an audio processing portion 1101, a speaker 1102, a control unit 1103, and a communication I/F 1104, and further includes a bus 1105 connecting these elements.

The audio processing portion 1101 includes a tuner, an audio circuit, and a power amplifier. The tuner receives musical piece data and acoustic signals from an external device such as the distribution server 1002 or the controller 1101 from an FM broadcast or via the communication I/F 1104, and inputs the received musical piece data and acoustic signals to an audio circuit. Note that the controller 1101 can convert the musical piece data provided from the distribution server 1002 or stored in the storage apparatus 13 into an acoustic signal, and can provide the acoustic signal to the acoustic devices a to h. Also, the acoustic signal input to the audio circuit may be generated by the control unit 1103 based on the musical piece data input via the communication I/F 1104 from an external device such as the distribution server 1002 or the controller 1101, the musical piece data stored in a recording medium such as a USB memory or a CD built into or externally added to the acoustic device a, or the like. The audio circuit performs effect processing such as equalizing and volume adjustment on the acoustic signal acquired in this manner, and thereafter outputs the acoustic signal resulting from the effect processing to the power amplifier. The power amplifier amplifies the input acoustic signal and outputs the resulting acoustic signal to the speaker 1102. The speaker 1102 emits the input acoustic signal as sound.

The communication I/F 1104 is connected to a wireless communication line such as Wi-Fi or Bluetooth (registered trademark) or a wired communication line, so as to be able to communicate with the controller 1001. The control unit 1103 includes a CPU, a ROM, and a RAM, and the CPU causes the acoustic device a to execute various types of operations by executing programs stored in the ROM or in a storage apparatus (not shown). The control unit 1103 receives various commands from the controller 1001 and controls the operations of the acoustic device a in accordance with the commands.

The acoustic system 1000 can reproduce identical content in a synchronized manner in acoustic devices set as a group, among the acoustic devices a to h. The groups are set by the controller 1001 in accordance with commands from a user operating the controller 1001. The content is, for example, a musical piece, and the musical piece data acquired through various methods is the source thereof. The file format of the musical piece data is, for example, MP3, WAV, SoundVQ (registered trademark), WMA (registered trademark), AAC, or the like.

(2-4) Configuration of Distribution Server

The distribution server 1002 is a server that includes a database that holds various types of musical piece data, and that distributes the musical piece data in the database in response to requests from client terminals such as the controller 1001 and the acoustic devices a to h that access the distribution server 1002. The hardware of the distribution server 1002 is a general-purpose computer, and the distribution server 1002 executes various operations by executing a predetermined program.

(2-5) Configuration of Parts

The user can control the operations of the acoustic devices a to h via the controller 1001. In the controller 1001, the acoustic devices a to h are managed as parts using the above-described part management information. In other words, the controller 1001 allocates the acoustic signals a to h to the parts, which serve as units of management, in one-to-one correspondence. The acoustic devices to be allocated to the parts can be designated by the user.

Figure 16:
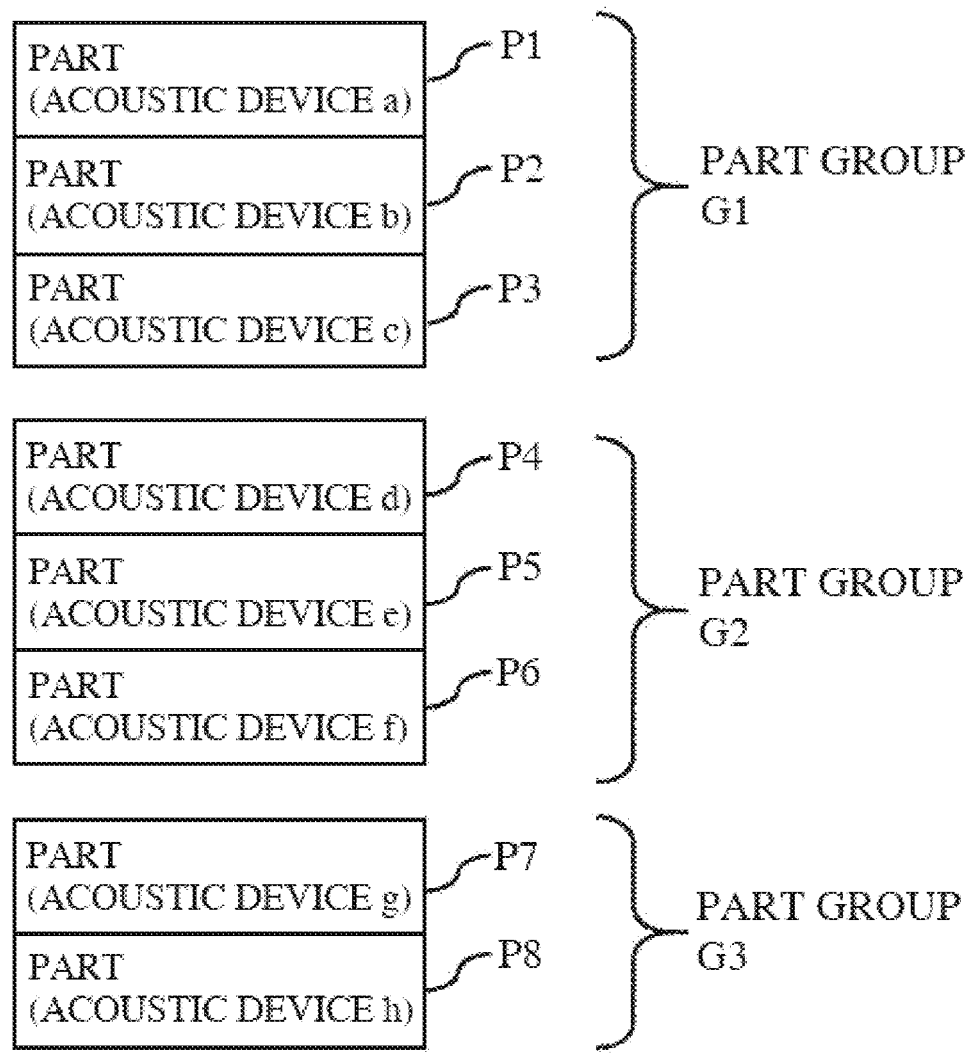
FIG. 16 is a diagram for illustrating an exemplary configuration of parts according to the second embodiment.

Also, the multiple parts managed by the controller 1001 are divided into multiple part groups. The part groups can be set as appropriate by the user as groups of one or more parts. To give a typical setting example, a part group is constituted by one or more parts corresponding to one or more acoustic devices arranged in a certain specific room. That is, the rooms are allocated to the part groups in one-to-one correspondence, and thus the acoustic devices can be managed using the rooms as units of management. Hereinafter, description will be given premised on this kind of example. As shown in FIG. 16, in the present embodiment, there are eight parts P1 to P8 corresponding to the eight acoustic devices a to h and the parts P1 to P8 are divided into three part groups G1 to G3. The part group G1 includes the parts P1 to P3, the part group G2 includes the parts P4 to P6, and the part group G3 includes the parts P7 and P8. The part group G1 corresponds to the room A, the part group G2 corresponds to the room B, and the part group G3 corresponds to the room C. In the controller 1001, the information of the parts included in the part group are managed based on the ID number of the room serving as the installation location included in the part management information.

(2-6) Management Screen

Figure 17:
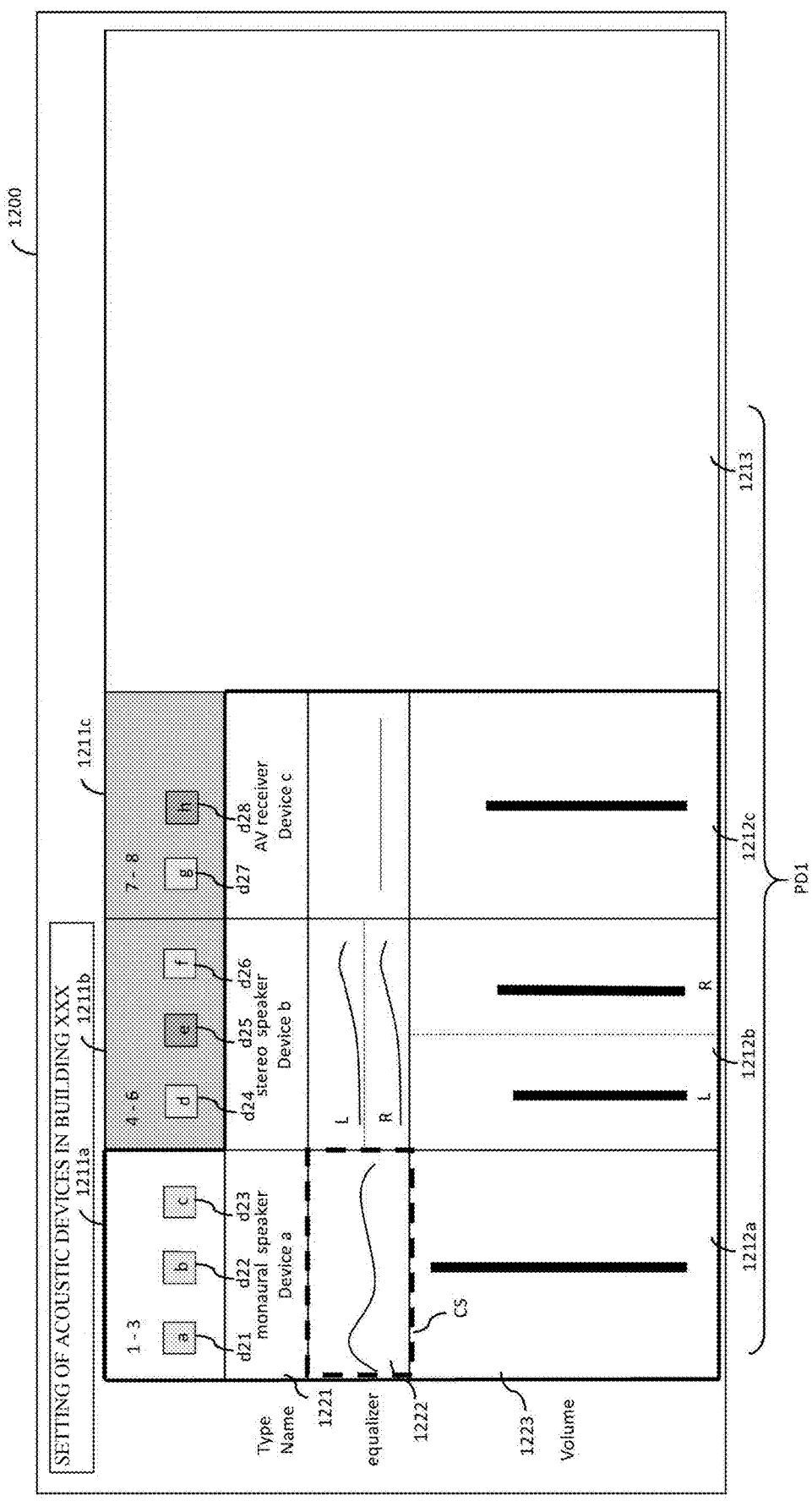
FIG. 17 is a diagram showing an example of a management screen displayed on a display according to the second embodiment.

When the user adds a predetermined operation to the operation setter 4 of the controller 1001, the management screen is displayed on the display 6 of the controller 1001. The management screen includes the information of the parts. FIG. 17 is a diagram showing an example of a management screen displayed on the display 6. The management screen 1200 of FIG. 17 includes tabs 1211*a* to 1211*c*, part display regions 1212*a* to 1212*c*, and an additional display region 1213.

The tabs 1211*a* to 1211*c* are arranged aligned in the left-right direction. The tabs 1211*a* to 1211*c* correspond to the part groups G1 to G3 of FIG. 16. The digest information relating to the parts in the corresponding part group is displayed superimposed on the tabs 1211*a* to 1211*c*. In the present example, it is indicated whether the acoustic devices allocated to the parts are in use or not in use, and identification marks d21 to d28 indicating the names of the acoustic devices allocated to the parts are display superimposed on the tabs 1211*a* to 1211*c* as the digest information. The identification marks d21 to d23 are displayed on the tab 1211*a*, the identification marks d24 to d26 are displayed on the tab 1211*b*, and the identification marks d27 and d28 are displayed on the tab 1211*c*.

The identification marks d21 to d28 correspond to the parts P1 to P8 of FIG. 16. Each of the identification marks d21 to d28 indicates whether or not the corresponding part is in use or not in use through a difference in color. For example, each of the identification marks d21 to d28 is displayed with a relatively bright color if the corresponding part is in use, and is displayed with a relatively dark color if the corresponding part is not in use. In FIG. 17, the identification marks corresponding to the parts that are in use are denoted by lighter colors. In the present example, the identification marks d21 to d24, d26, and d27 are denoted by light colors. Accordingly, the parts P1 to P4, P6, and P7 are in use, and the parts P5 and P8 are not in use. Also, the identification marks d21 to d28 respectively indicate the names of the acoustic devices allocated to the corresponding parts as text information.

The user can select any one of the tabs 1211*a* to 1211*c*. The selected tab is displayed highlighted, for example, such that it can be easily visually checked. In the example of FIG. 17, the tab 1211*a* has been selected.

The part display regions 1212*a* to 1212*c* are arranged on the lower side of the tabs 1211*a* to 1211*c*. The additional display region 1213 is arranged on the right side of the tabs 1211*a* to 1211*c* and the part display regions 1212*a* to 1212*c*. The part detail screen PD1 is constituted by the part display regions 1212*a* to 1212*c* and the additional display region 1213.

Note that the layout of the management screen 1200 is not limited to the example of FIG. 17. For example, the part display regions 1212*a* to 1212*c* may also be provided aligned vertically, or may be provided aligned vertically and laterally in a tiled form. Also, the positional relationship in the left-right direction of the part display regions 1212*a* to 1212*c* and the additional display region 1213 may be reversed.

(2-7) Display Example in Part Display Region

The information of the parts of the part group corresponding to the selected tab are displayed in the part display regions 1212*a* to 1212*c*. For example, if the tab 1211*a* has been selected as in the example of FIG. 17, the information of the part P1 is displayed in the part display region 1212*a*, the information of the part P2 is displayed in the part display region 1212*b*, and the information of the part P3 is displayed in the part display region 1212*c*. Similarly, if the tab 1211*b* has been selected, the information of the parts P4 to P6 are displayed in the part display regions 1212*a* to 1212*c*, and if the tab 1211*c* has been selected, the information of the parts P7 to P8 is displayed in the part display regions 1212*a* and 1212*b*.

Hereinafter, regarding the display in the part display regions 1212*a* to 1212*c*, display in the part display region 1212*a* in the case where the tab 1211*a* has been selected will be described as an example. As shown in FIG. 17, the part display region 1212*a* includes a part name display portion 1221, an equalizer display portion 1222, and a volume display portion 1223.

The model name (part type) and name (part name) of the acoustic device allocated to part P1 are displayed in the part name display portion 221. In the example of FIG. 17, "monaural speaker" is displayed as the part type and "Device a" is displayed as the part name.

The equalizer setting is displayed in the equalizer display portion 1222. The equalizer setting is an example of parameter information and determines the setting of the sound equalizer. A sound to which an effect has been applied is produced from the acoustic device a in accordance with the equalizer setting. The volume setting is displayed in the volume display portion 1223. The volume setting is an example of parameter information and determines the output level (volume) of the sound. A sound with a volume in accordance with the volume setting is produced from the acoustic device a. Note that as shown in FIG. 17, if the acoustic device is a stereo speaker, two equalizer settings corresponding to L and R and two volume settings corresponding to L and R are displayed. However, the average value of L and R may also be displayed for one of both of the equalizer setting and the volume setting.

The setting information relating to the part name, part type, equalizer setting, and volume setting, which are displayed in the part display regions 1212*a* to 1212*c* can be set by the user as appropriate. As shown in FIG. 17, a cursor CS for designating one piece of setting information is displayed in the part display regions 1212*a* to 1212*c*. The user can move the cursor CS to any position in the part display regions 1212*a* to 1212*c*, and can designate a desired piece of setting information of a desired part. In the example of FIG. 17, the cursor CS is arranged in the equalizer display portion 1222 of the part display region 1212*a*. In this case, the equalizer setting of the part P1 has been designated.

(2-8) Display Example in Additional Display Region

Information relating to at least one part in the selected part group is displayed in the additional display region 1213 of FIG. 17. Hereinafter, the information displayed in the additional display region 1213 will be referred to as additional information. In the present example, the additional information corresponding to the setting information designated using the cursor CS is displayed in the additional display region 1213.

Figure 18:
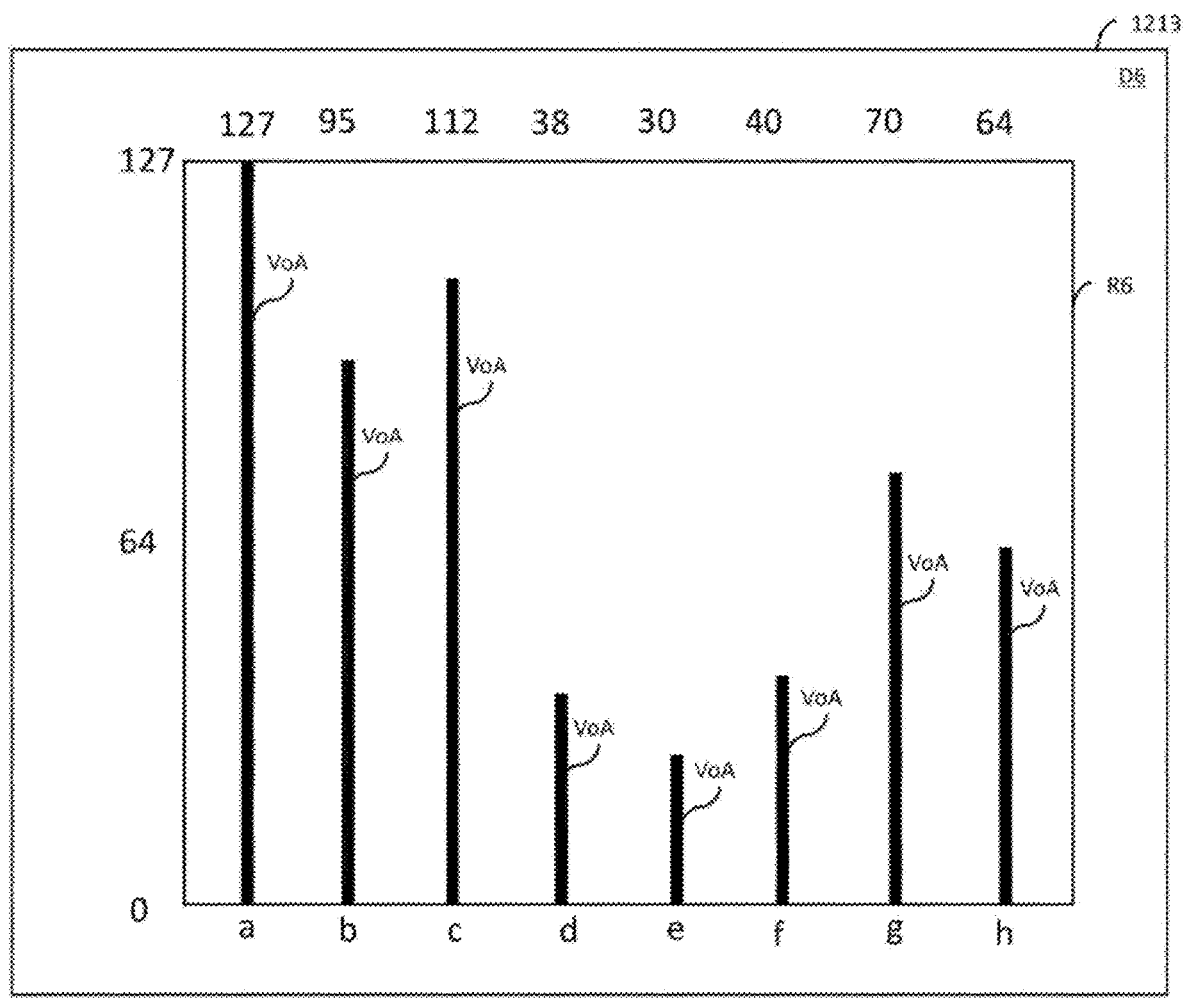
FIG. 18 is a diagram showing an example of display in an additional display region according to the second embodiment.
Figure 19:
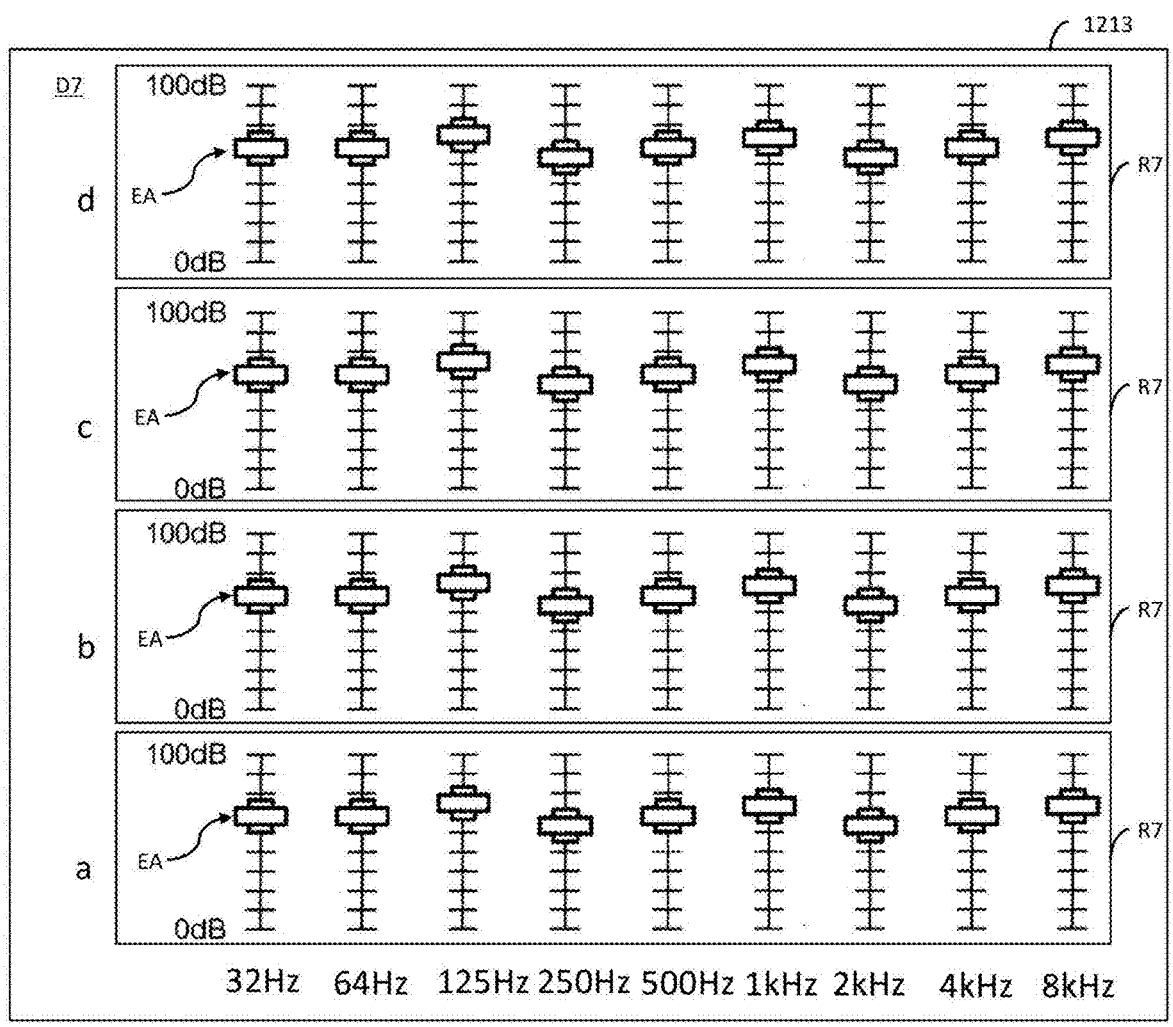
FIG. 19 is a diagram showing an example of display in an additional display region according to the second embodiment.

FIGS. 18 and 19 are diagrams showing display examples in the additional display region 1213. FIG. 18 shows an example of a volume setting screen D6 indicating the volume settings of the parts. If a volume setting has been designated using the cursor CS in any part display region, the volume setting screen D6 of FIG. 18 is displayed in the additional display region 1213 as the additional information.

As shown in FIG. 18, the volume setting screen D6 shows the volume settings of the parts in association with the corresponding parts. Specifically, the names of multiple acoustic devices corresponding to multiple parts are displayed aligned in the left-right direction below the volume setting screen D6, and a volume display region R6 is provided above the names. The horizontal axis of the volume display region R6 indicates the acoustic devices, that is, the parts, and the vertical axis indicates the volume settings. A volume adjuster VoA indicating the volume setting of the corresponding part is displayed in the volume display region R6. The volume adjuster VoA is an example of a parameter adjuster.

The volume setting indicated by the volume adjuster VoA matches the volume setting indicated on the volume display portion 1223 (FIG. 17) of the corresponding part display region. The user can move the upper end of the volume adjuster VoA in the vertical direction. Accordingly, the volume setting of the corresponding part is adjusted. When the position of the upper end of the volume adjuster VoA is changed, the display of the volume setting displayed on the volume display portion 1223 of the corresponding part display region is changed so as to comply with the change. The direction of changing the length of the volume adjuster VoA is not limited to the vertical direction, and for example, may also be the left-right direction. In this case as well, similarly, the volume setting of the corresponding part can be adjusted. Also, the volume setting set for the corresponding part is displayed as a numerical value on the upper side of the volume display region R6.

As shown in FIG. 19, the equalizer setting screen D7 indicates the equalizer settings of the parts in association with the corresponding parts. Specifically, the names of the multiple acoustic devices corresponding to the multiple parts are displayed aligned in the vertical direction on the left side of the equalizer setting screen D7, and the equalizer display region R7 is provided on the right side of these names. The number of equalizer display regions R7 that are displayed aligned in the vertical direction is the same as the number of parts corresponding to the acoustic devices for which names are displayed on the equalizer setting screen D7. The horizontal axes of the equalizer display regions R7 indicate the frequencies to be adjusted, and the vertical axes indicate the intensity levels of the sounds of the frequencies to be adjusted. The equalizer adjusters EA indicating the intensity levels of the sounds of the frequencies of the parts are displayed in the equalizer display regions R7. The equalizer adjusters EA are examples of parameter adjusters.

The equalizer setting indicated by the equalizer adjuster EA matches the equalizer setting displayed on the equalizer display portion 1222 (FIG. 17) of the corresponding part display region. The user can move the knobs of the equalizer adjusters EA along the axis in the vertical direction. Thus, the intensity level of the sound of the corresponding frequency of the part is adjusted. When the position of the knob of the equalizer adjuster EA is changed, the display of the equalizer setting displayed on the equalizer display portion 1222 of the corresponding part display region is changed so as to comply with the change. The direction of moving the knob of the equalizer adjuster EA is not limited to the vertical direction, and may also be the left-right direction, for example. In this case as well, similarly, the equalizer setting of the corresponding part can be adjusted.

(2-9) Functional Configuration of Controller

Figure 20:
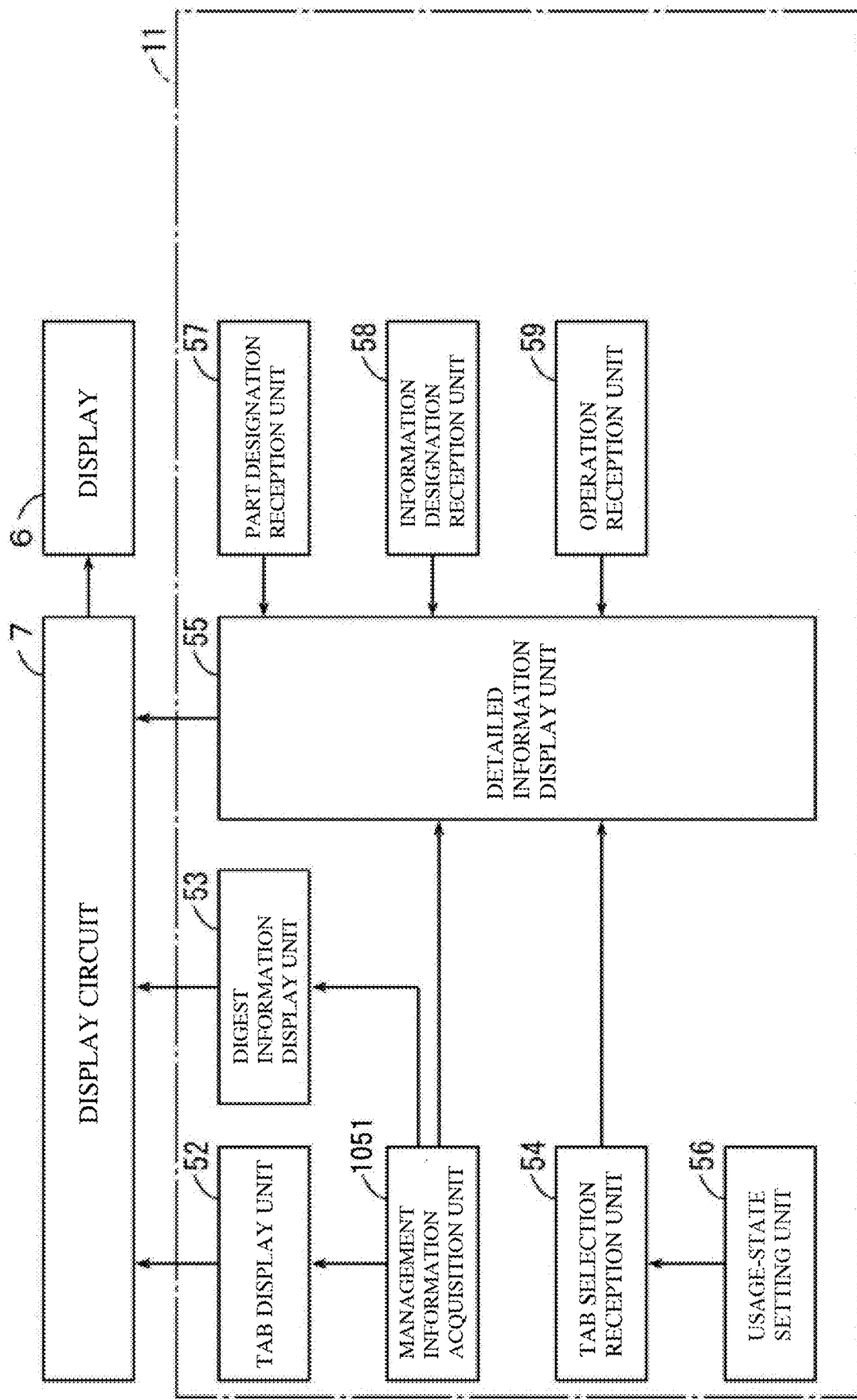
FIG. 20 is a block diagram showing a functional configuration of the controller of FIG. 14.

FIG. 20 is a block diagram showing a functional configuration of the controller 1001. As shown in FIG. 20, similarly to the electronic music apparatus 1 of the first embodiment, the controller 1001 includes a tab display unit 52, a digest information display unit 53, a tab selection reception unit 54, a detailed information display unit 55, a usage-state setting unit 56, a part designation reception unit 57, a information designation reception unit 58, and an operation reception unit 59. The operations of the units 52 to 59 are similar to those of the electronic music apparatus 1 of the first embodiment. Also, the controller 1001 further includes a management information acquisition unit 1051 instead of the performance data acquisition unit 51. The management information acquisition unit 1051 acquires the part management information from the storage apparatus 13, and the tab display unit 52, the digest information display unit 53, and the detailed information display unit 55 control various types of display based on the acquired part management information.

The functions of the units of the controller 1001 in FIG. 20 are realized due to the CPU 11 executing the part display program stored in the ROM 10 or the storage apparatus 13. The units 52 to 59 and 1051 execute part display processing similar to that shown in FIG. 12. However, in the present embodiment, in step S1, the management information acquisition unit 1051 acquires the part management information, and steps S11 to S13 are omitted.

(3) Other Embodiments (a) The first embodiment is an example in which the present invention is applied to an electronic keyboard musical instrument, but the present invention may also be applied to another electronic music apparatus that can display information relating to multiple parts. For example, the present invention may also be applied to another electronic musical instrument such as an electronic guitar or electronic drums. In this case, the musical instrument main body and the display may also be separate. Also, as another electronic music apparatus, the present invention may also be applied to a personal computer or the like in which a mixer, a sequencer apparatus (hardware sequencer), a software sequencer, or a software mixer is installed. The part display apparatus for performing the above-described part display processing can be preferably equipped in an electronic music apparatus or any computer (control terminal apparatus) connected thereto.

(b) In the first embodiment, a timbre is allocated to a part, but other music data may also be allocated to a part, instead of a timbre. For example, if the present invention is applied to a mixer, audio data may also be allocated to the multiple parts. Also, timbres may be allocated to some parts, and audio data may be allocated to some other parts.

(c) In the above-described embodiments, whether the part is in use or not in use is displayed as the digest information, but other information may also be displayed as the digest information. For example, taking the first embodiment as example, the part type or part name may also be displayed as the digest information. Also, if multiple types of sound sources are used, the type of sound source corresponding to the timbre allocated to the part may also be displayed as the digest information. Alternatively, if an internal sound source that generates an acoustic signal inside of the electronic music apparatus 1 and an external sound source that generates an acoustic signal outside of the electronic music apparatus 1 are used as sound sources, the internal sound source or external sound source to which the timbre allocated to the part corresponds may also be displayed as the digest information.

Furthermore, for example, in a mixer, as the digest information, it is also possible to display whether or not the volume of the part is greater than a threshold value. For example, an identification mark indicates whether the part is in use or not in use, and it is also possible to indicate whether the volume of the part is greater than a threshold value due to blinking of the identification mark or further change in the color of the identification mark. The blinking of the identification mark or further change in the color of the identification mark may also occur according to whether or not the instantaneous volume of the sound data corresponding to the part is greater than a threshold value. Also, for example, the identification mark may indicate whether the part is in use or not in use, and the blinking of the identification mark or further change in the color of the identification mark may occur in response to the occurrence of a MIDI (Musical Instrument Digital Interface) message. These pieces of digest information may also be displayed on the tabs as marks, similarly to the above-described embodiment, or may be displayed on the tabs as symbols, text, or the like.

In the above-described embodiment, although the digest information is displayed on all of the tabs, the digest information need not be displayed on at least one tab.

(d) The part group corresponding to the tabs may also be determined in advance, or may be designated as needed by the user. For example, taking the first embodiment as an example, the parts P1, P4, P9, and P10 can be designated as a part group corresponding to the tab 211a of FIG. 3, the parts P2, P7, P13, and P16 can be designated as the part group corresponding to the tab 211b, and the like. Also, the permutation of the parts in the part groups may be changed as appropriate. For example, taking the first embodiment as an example, the permutation of the part group G1 of FIG. 2 may be changed to the following order: parts P3, P2, P4, and P1, or the like. In this case, the alignment of the display of the digest information and the parts associated with the part display regions are changed according to the changed permutation.

(e) In the above-described embodiment, the functional units of FIGS. 11 and 20 are realized through hardware such as the CPU 11 and software such as the part display program, but the functional units may also be realized through hardware such as an electronic circuit.

(f) In the second embodiment, the acoustic devices are allocated to parts, and part groups are set with reference to rooms, but the rooms may be allocated to the parts, and multiple rooms may be gathered as a part group.

(4) Correspondence Between Constituent Elements of Claims and Units of Embodiments Hereinafter, an example of correspondence between the constituent elements of the claims and the units of the first and second embodiments will be described, but the present invention is not limited to the following example. The CPU 11 of the above-described first embodiment is an example of a part display apparatus, the tab display unit 52 is an example of a tab display means, the digest information display unit 53 is an example of a digest information display means, the tab selection reception unit 54 is an example of a tab selection reception means, the detailed information display unit 55 is an example of a detailed information display means, the usage-state setting unit 56 is an example of a usage-state setting means, the part designation reception unit 57 is an example of a part designation reception means, the information designation reception unit 58 is an example of an information designation reception means, the operation reception unit 59 is an example of an operation reception means, the pitch range setting unit 60 is an example of a pitch range setting means, and the correspondence relationship setting unit 61 is an example of a correspondence relationship setting means. Also, the various types of setting information are examples of first information, and the various types of additional information are examples of second information. Various other elements having the configurations or functions disclosed in the claims can be used as the constituent elements of the claims.

INDUSTRIAL APPLICABILITY

The present invention can be used in various types of electronic music apparatuses, control terminal apparatuses of various types of acoustic devices, and the like.

LIST OF REFERENCE NUMERALS

1 Electronic music apparatus
2 Performance operation unit
3 Detection circuit
4 Setting operator
5 Detection circuit
6 Display
7 Display circuit
9 RAM
10 ROM
11 CPU (part display apparatus)
12 Timer
13 Storage apparatus
14 Communication I/F
15 External storage apparatus
16 Sound source
17 Sound system
19 Bus
51 Performance data acquisition unit
52 Tab display unit
53 Digest information display unit
54 Tab selection reception unit
55 Detailed information display unit
56 Usage-state setting unit
57 Part designation reception unit
58 Information designation reception unit
59 Operation reception unit
60 Pitch range setting unit
61 Correspondence relationship setting unit
200 Performance screen
201 Name display region
203 Display switching button
211a to 211d, 1211a to 1211c Tab
212a to 212d, 1212a to 1212c Part display region
213, 1213 Additional display region
1000 Acoustic system
1002 Distribution server
1001 Controller (control terminal apparatus)
a to h Acoustic device

The invention claimed is:

1. A part display apparatus for displaying a part on a display, the part display apparatus comprising:
a processor configured to:
cause the display to display a screen that displays:
a plurality of tabs respectively corresponding to a plurality of part groups; and
in each of the plurality of tabs, digest information of each part of the part group corresponding to the respective tab;
receive selection of any one of the plurality of tabs displayed on the screen; and wherein the displayed screen displays detailed information of the part group corresponding to the selected tab with the plurality of tabs including the digest information, which indicates whether or not each part of the part group corresponding to the respective digest information is in use.

2. The part display apparatus according to claim 1, wherein the processor is further configured to set each part of the plurality of part groups to be in use or not in use.

3. The part display apparatus according to claim 2, wherein:
the screen includes a plurality of part display regions respectively corresponding to the plurality of parts of the part group corresponding to the selected tab, and
in each part display region, the detailed information corresponds to first information relating to the part corresponding to the respective part display region.

4. The part display apparatus according to claim 2, wherein one or more timbres are allocated to the part.

5. The part display apparatus according to claim 2, wherein an acoustic device is allocated to the part.

6. The part display apparatus according to claim 1, wherein:
the screen includes a plurality of part display regions respectively corresponding to the plurality of parts of the part group corresponding to the selected tab, and
in each part display region, the detailed information corresponds to first information relating to the part corresponding to the respective part display region.

7. The part display apparatus according to claim 6, wherein:
the screen further includes an additional display region, and
the processor is further configured to display second information relating to at least one part in the plurality of part groups in the additional display region.

8. The part display apparatus according to claim 7, wherein:
the processor is further configured to receive designation of any one part in the plurality of part groups,
the second information relates to the designated part.

9. The part display apparatus according to claim 8, wherein:
the first information includes a plurality of pieces of setting information set for a corresponding part,
the processor is further configured to receive designation of any one of the plurality of pieces of setting information in the part display region corresponding to the designated part, and
the second information corresponds to the designated setting information.

10. The part display apparatus according to claim 9, wherein:
at least one of the plurality of pieces of setting information is parameter information indicating a parameter,
in a case where the parameter information has been designated among the plurality of pieces of setting information, the second information corresponds to a parameter adjuster for adjusting the parameter indicated by the designated parameter information, and the processor is further configured to:
receive an operation of the parameter adjuster in the additional display region; and
cause the display to change display of the designated parameter information in the part display region to comply with the operation of the parameter adjuster in the additional display region.

11. The part display apparatus according to claim 1, wherein one or more timbres are allocated to the part.

12. The part display apparatus according to claim 1, wherein an acoustic device is allocated to the part.

13. An electronic music apparatus comprising:
the part display apparatus according to claim 1;
a sound source circuit configured to generate an acoustic signal, and connected to the part display apparatus; and
a speaker connected to the sound source circuit.

14. A control terminal apparatus comprising
the part display apparatus according to claim 1; and
the display connected to the part display apparatus.

15. An electronic music apparatus comprising:
the part display apparatus according to claim 7;
a plurality of pitch designators;
wherein the processor is further configured to set:
a pitch range for each part; and
a correspondence relationship between the set pitch range and the plurality of pitch designators,
wherein the set correspondence relationship is displayed in the additional display region.

16. A part display method comprising:
displaying, on a display, a screen that displays:
a plurality of tabs respectively corresponding to a plurality of part groups; and
in each of the plurality of tabs, digest information of each part of the part group corresponding to the respective tab;
receiving selection of any one of the plurality of tabs; and
wherein the displayed screen displays detailed information of the part group corresponding to the selected tab with the plurality of tabs including the digest information, which indicates whether or not each part of the part group corresponding to the respective digest information is in use.

17. A non-transitory computer readable medium storing a program executable by a computer to execute a method comprising:
displaying, on a display, a screen that displays:
a plurality of tabs respectively corresponding to a plurality of part groups; and
in each of the plurality of tabs, digest information of each part of the part group corresponding to the respective tab;
receiving selection of any one of the plurality of tabs; and
wherein the displayed screen displays detailed information of the part group corresponding to the selected tab with the plurality of tabs including the digest information, which indicates whether or not each part of the part group corresponding to the respective digest information is in use.

* * * * *